US011979251B2

(12) United States Patent
Xu et al.

(10) Patent No.: US 11,979,251 B2
(45) Date of Patent: May 7, 2024

(54) HOME DEVICE CONTROL METHOD AND DEVICE

(71) Applicant: HUAWEI TECHNOLOGIES CO., LTD., Guangdong (CN)

(72) Inventors: Tianliang Xu, Xi'an (CN); Bingyi Liu, Shenzhen (CN); Rui Shi, Shenzhen (CN); Liangliang Ma, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/042,775

(22) PCT Filed: Aug. 18, 2021

(86) PCT No.: PCT/CN2021/113214
§ 371 (c)(1),
(2) Date: Feb. 24, 2023

(87) PCT Pub. No.: WO2022/057557
PCT Pub. Date: Mar. 24, 2022

(65) Prior Publication Data
US 2023/0362028 A1  Nov. 9, 2023

(30) Foreign Application Priority Data

Sep. 17, 2020 (CN) .......................... 202010981147.9

(51) Int. Cl.
*H04L 9/08* (2006.01)
*H04L 12/28* (2006.01)

(52) U.S. Cl.
CPC ........ *H04L 12/2809* (2013.01); *H04L 9/0869* (2013.01); *H04L 12/2816* (2013.01)

(58) Field of Classification Search
None
See application file for complete search history.

(56) References Cited

U.S. PATENT DOCUMENTS

| 2002/0151992 | A1 | 10/2002 | Hoffberg et al. |
| 2014/0307626 | A1 | 10/2014 | Hintersteiner et al. |
| 2019/0014375 | A1 | 1/2019 | Liu |

(Continued)

FOREIGN PATENT DOCUMENTS

| CN | 1567865 A | 1/2005 |
| CN | 101217297 A | 7/2008 |

(Continued)

*Primary Examiner* — Brian Whipple
(74) *Attorney, Agent, or Firm* — HUAWEI TECHNOLOGIES CO., LTD.

(57) ABSTRACT

A home device control method and a device. When detecting that the home device meets a preset condition, the electronic device sends a second message to the home device, to indicate the home device to use a first antenna and to indicate to obtain a random code; receives the random code sent by the home device by using the first antenna; accesses a wireless local area network based on the random code, and obtains configuration information including an interface element of a control page and a control instruction that are used to control the home device; and displays the control page and interacts with a user by using the control page, and sends the control instruction to the home device through the wireless local area network, to control the home device.

20 Claims, 25 Drawing Sheets

(56) References Cited

U.S. PATENT DOCUMENTS

| | | |
|---|---|---|
| 2019/0363904 A1 | 11/2019 | Drake |
| 2020/0008056 A1 | 1/2020 | Wu et al. |
| 2021/0266712 A1* | 8/2021 | Magnavacca ........... H04W 4/80 |

FOREIGN PATENT DOCUMENTS

| | | |
|---|---|---|
| CN | 203732917 U | 7/2014 |
| CN | 104408904 A | 3/2015 |
| CN | 204206204 U | 3/2015 |
| CN | 104754127 A | 7/2015 |
| CN | 105491682 A | 4/2016 |
| CN | 107465584 A | 12/2017 |
| CN | 108572554 A | 9/2018 |
| CN | 109219043 A | 1/2019 |
| CN | 109541950 A | 3/2019 |
| CN | 109947031 A | 6/2019 |
| CN | 110320811 A | 10/2019 |
| CN | 110336720 A | 10/2019 |
| CN | 112286147 A | 1/2021 |
| EP | 3979571 A1 | 4/2022 |
| EP | 4096307 A1 | 11/2022 |
| JP | 2019068338 A | 4/2019 |

\* cited by examiner

HOME DEVICE CONTROL METHOD AND DEVICE

CROSS REFERENCE TO RELATED APPLICATIONS

This application is a national stage of International Application No. PCT/CN2021/113214, filed on Aug. 18, 2021, which claims priority to Chinese Patent Application No. 202010981147.9, filed on Sep. 17, 2020. Both of the aforementioned applications are incorporated herein by reference in their entireties.

TECHNICAL FIELD

Embodiments of this application relate to the field of communications technologies, and in particular, to a home device control method and a device.

BACKGROUND

With the development of electronic information technologies, smart home gradually enters people's daily life. In smart home, a house may be used as a platform and a wireless local area network such as a wireless fidelity (Wireless Fidelity, Wi-Fi) network is used to integrate and control home devices related to a home life, to improve home safety, convenience, and comfort.

Specifically, a smart home application (Application, APP) for controlling a home device may be installed on an electronic device (such as a mobile phone or a tablet computer) of a user. A prerequisite for controlling the home device by using a management APP is that the home device is configured with a network and registered with a home cloud of the smart home APP.

A network configuration and registration process of the home device may include the following four steps: (1) The home device is ready for network configuration, and broadcasts a Wi-Fi signal, so that the home device can be discovered. (2) An electronic device (such as a mobile phone) performs scanning by using the smart home APP and discovers the home device. (3) The mobile phone establishes a Wi-Fi connection to the home device, and sends an SSID and a password of a wireless local area network to the home device. The home device connects to a router based on the SSID and the password. (4) The mobile phone uses the smart home APP to help the home device register with the home cloud of the smart home APP.

In the foregoing solution, network configuration and registration of each home device may be completed by performing the foregoing four steps, and then the user can control the home device by using the management APP. The foregoing network configuration and registration process of the home device is relatively complex, and takes a relatively long time. As a result, an operation of controlling the home device by using the management APP is complex, and user experience is relatively poor.

SUMMARY

Embodiments of this application provide a home device control method and a device. Regardless of whether a home device is configured with a network and registered, an electronic device can control the home device, so that a home device control process can be simplified, and use experience of the home device can be improved.

According to a first aspect, this application provides a home device control method, and the method may be used by an electronic device to control a home device. The home device includes a first antenna and a second antenna, a transmitting distance of the first antenna is a first distance, and a transmitting distance of the second antenna is a second distance. The first distance is less than the second distance.

In the method, the home device may broadcast first messages. After the home device broadcasts the first messages, the electronic device may detect that the home device meets a preset condition. That the electronic device detects that the home device meets the preset condition may include: The electronic device receives, within first preset duration, N first messages broadcast by the home device. Then, when detecting that the home device meets the preset condition, the electronic device may send a second message to the home device. The second message is used to indicate the home device to use the first antenna and is used to indicate to obtain a random code from the home device, and the random code is used to access a wireless local area network provided by the home device. The home device may receive the second message from the electronic device, send a random code to the electronic device by using the first antenna, and provide the wireless local area network by using the first antenna. Then, the electronic device may access the wireless local area network based on the random code, and obtain configuration information of the home device. The configuration information includes an interface element of a control page and a control instruction that are used to control the home device. Finally, the electronic device displays the control page of the home device, interacts with a user by using the control page, and sends the control instruction to the home device through the wireless local area network, so as to control the home device.

In a solution of this application, when detecting that the home device meets the preset condition (for example, the electronic device receives, within the first preset duration, the N first messages broadcast by the home device), the electronic device may send the second message to the home device, to indicate the home device to use the first antenna and to indicate to obtain the random code from the home device. After obtaining the random code, the electronic device may access the wireless local area network based on the random code.

Only when the electronic device moves close to the home device (for example, the electronic device touches the home device), the electronic device can detect that the home device meets the preset condition, and can trigger a control process of the home device. In this solution, the electronic device moves close to the home device (for example, the electronic device touches the home device), so that a home device 2 may be controlled to use the first antenna (that is, an ultra-short-haul antenna or a weak antenna), and the electronic device is automatically connected to the home device. In this way, the electronic device may obtain the configuration information of the home device from the home device, and display the control page of the home device, to control the home device.

In addition, the home device may send the random code only to a device that detects that the home device meets the preset condition. In this way, only the device (such as the electronic device) that detects that the home device meets the preset condition can receive the random code, and only the electronic device can access, based on an SSID and the random code, the wireless local area network provided by the home device. In this way, another device may be prevented from accessing the wireless local area network provided by the home device by mistake, and the another device may be prevented from obtaining the configuration information of the home device.

Further, in this application, ultra-short distance communication is used, and the home device sends the random code to the electronic device by using the first antenna, to ensure that the random code sent by the home device is not received by another device, and ensure security of data transmission between the electronic device and the home device. Further, another device can be prevented from accessing, by using the random code, the wireless local area network provided by the home device, to protect information security of the user.

It should be noted that the method in this application is not only applicable to a home device that is configured with a network and registered, but also applicable to a home device that is not configured with a network or registered. That is, regardless of whether the home device is configured with a network and registered, the electronic device can control the home device by using this solution. In this way, the home device control process can be simplified, and use experience of the home device can be improved.

The method provided in this application is particularly applicable to some users who are unfamiliar with a network configuration and registration process of a home device. For such users, the use experience of the home device is improved by using the foregoing solution in which the electronic device can control the home device only by holding the electronic device to touch the home device.

In a possible design manner of the first aspect, that the electronic device detects that the home device meets the preset condition further includes: Signal strength of the N first messages is greater than a first strength threshold, and/or the home device that broadcasts the first messages supports a preset home service.

In other words, when the electronic device receives, within the first preset duration, the N first messages broadcast by the home device, the signal strength of the N first messages is greater than the first strength threshold, and/or the home device that broadcasts the first messages supports the preset home service, it indicates that the electronic device detects that the home device meets the preset condition.

In another possible design manner of the first aspect, before the electronic device detects that the home device meets the preset condition, the method in this application may further include: sending first prompt information after the electronic device receives one first message broadcast by the home device that supports a preset home service. The first prompt information is used to indicate the user to move the electronic device close to the home device in a preset manner.

The preset manner includes: moving the electronic device close to the home device, to keep a distance between the electronic device and the home device within the first distance for at least second preset duration. The second preset duration is greater than or equal to the first preset duration.

In another possible design manner of the first aspect, the preset manner specifically includes: moving the electronic device close to and then away from the home device M times within the second preset duration, where a distance between the electronic device and the home device is within the first distance.

That the electronic device detects that the home device meets the preset condition further includes: a signal strength of N first messages changes M times under a preset fluctuation condition. A change under the preset fluctuation condition is that: After a signal strength of one or more first messages received by the electronic device is greater than a second strength threshold, signal strength of one or more first messages received by the electronic device is less than a third strength threshold. The second strength threshold is greater than the third strength threshold, the second strength threshold is greater than the first strength threshold, and the first strength threshold is greater than or equal to the third strength threshold.

For example, M=3. That the signal strength of the N first messages changes three times under the preset fluctuation condition may be specifically: The signal strength of the one or more first messages received by the electronic device is greater than the second strength threshold, and the signal strength of the one or more first messages received by the electronic device is less than the third strength threshold; then the signal strength of the one or more first messages received by the electronic device is greater than the second strength threshold, and the signal strength of the one or more first messages received by the electronic device is less than the third strength threshold; and then the signal strength of the one or more first messages received by the electronic device is greater than the second strength threshold, and the signal strength of the one or more first messages received by the electronic device is less than the third strength threshold.

According to the method in this application, the electronic device touches the home device (for example, moves close and away three times within 5 s), so that the home device may be controlled to use the first antenna, and the electronic device can control the home device.

In another possible design manner of the first aspect, that the home device broadcasts the first messages may include: The home device periodically switches between the first antenna and the second antenna for use, and broadcasts the first messages when the home device uses the first antenna.

That the second message is used to indicate the home device to use the first antenna specifically includes: The second message is used to indicate the home device to stop switching between the first antenna and the second antenna for use, and use the first antenna.

In another possible design manner of the first aspect, the wireless local area network may be an encrypted wireless local area network. That is, not only the SSID but also an access password is required for accessing the wireless local area network.

In this design manner, the random code may be an access password of the wireless local area network. The first message includes a service set identifier (service set identifier, SSID) of the wireless local area network.

That the electronic device accesses the wireless local area network based on the random code includes: The electronic device accesses the wireless local area network based on the SSID and the access password. The method may further include: If the SSID and the access password are correct, the home device allows the electronic device to access the wireless local area network.

In another possible design manner of the first aspect, the wireless local area network is an encrypted wireless local area network. That is, not only the SSID but also an access password is required for accessing the wireless local area network.

In such design manner, the first message includes an SSID and an access password of the wireless local area network. The random code is used to perform identity authentication on a device that requests to access the wireless local area network. For example, the random code is an identity authentication code used to verify a device that requests to access the wireless local area network.

That the electronic device accesses the wireless local area network based on the random code may include: The electronic device requests to access the wireless local area network based on the SSID, the access password, and the random code. The method further includes: If the random code is the random code sent by the home device to the electronic device, and the SSID and the access password are correct, the home device allows the electronic device to access the wireless local area network.

In another possible design manner of the first aspect, the wireless local area network is an unencrypted wireless local area network. That is, no access password is required for accessing the wireless local area network.

In such design manner, the first messages includes an SSID of the wireless local area network. The random code is used to perform identity authentication on a device that requests to access the wireless local area network. For example, the random code is an identity authentication code used to verify a device that requests to access the wireless local area network.

The electronic device requests to access the wireless local area network based on the SSID and the random code. The method further includes: If the random code is the random code sent by the home device to the electronic device, and the SSID is correct, the home device allows the electronic device to access the wireless local area network.

In this case, the home device sends the random code only to the electronic device that detects that the home device meets the preset condition. Therefore, even if another device can obtain the SSID of the wireless local area network provided by the home device, the another device cannot successfully access the wireless local area network provided by the home device provided that the another device does not obtain the random code or the random code is incorrect.

In another possible design manner of the first aspect, before that the home device allows the electronic device to access the wireless local area network, the method in this application further includes: The home device determines that the random code is within a validity period.

If the random code in an access request is within the validity period, the home device may allow the electronic device to access the wireless local area network provided by the home device. If the random code in an access request is not within the validity period, the home device may forbid the electronic device to access the wireless local area network provided by the home device.

In another possible design manner of the first aspect, the electronic device may obtain the configuration information of the home device from the home device. Specifically, the electronic device may obtain the configuration information of the home device from the home device through the wireless local area network.

In another possible design manner of the first aspect, the electronic device may obtain the configuration information of the home device from a cloud server. Specifically, the electronic device may obtain capability information of the home device from the home device through the wireless local area network, and then obtain the configuration information of the home device from the cloud server based on the capability information of the home device. The capability information is used to indicate a device type of the home device.

The home device may send the configuration information of the home device or the capability information of the home device to the electronic device by using the first antenna.

In another possible design manner of the first aspect, to improve use experience of an owner of the home device in using the home device, and ensure security in a use process of the home device, in some embodiments, only an electronic device that logs in to an authorized account can obtain a control right of the home device. In other words, only the electronic device that logs in to the authorized account can control the home device.

Specifically, before the home device sends the configuration information or the capability information to the electronic device by using the first antenna, the method in this application further includes: The home device performs an authorization determination on the electronic device, so as to determine whether the electronic device has permission to obtain the configuration information or the capability information; and if the authorization determination succeeds, the home device sends the configuration information or the capability information to the electronic device. If the authorization determination of the electronic device fails, the control process of the home device ends.

In another possible design manner of the first aspect, the method further includes: The home device receives the control instruction through the wireless local area network by using the second antenna. In this embodiment, in a phase in which the electronic device controls the home device by using the control instruction, the home device may switch to using a long-distance antenna. In this way, the user can remotely control the home device by using the electronic device.

In another possible design manner of the first aspect, that the electronic device displays the control page of the home device includes: The electronic device displays the control page by using a leftmost screen or a notification message; or the electronic device displays third prompt information for the control page by using a leftmost screen or a notification message, and the electronic device displays the control page in response to a tap operation performed by the user on the third prompt information.

According to a second aspect, this application provides a home device control method, and the method may be used by an electronic device to control a home device. The home device includes a first antenna and a second antenna, a transmitting distance of the first antenna is a first distance, and a transmitting distance of the second antenna is a second distance. The first distance is less than the second distance.

The method includes: The electronic device may send a second message to the home device when the electronic device detects that the home device meets a preset condition. That the electronic device detects that the home device meets the preset condition includes: The electronic device receives, within first preset duration, N first messages broadcast by the home device. The second message is used to indicate the home device to use the first antenna and is used to indicate to obtain a random code from the home device, and the random code is used to access a wireless local area network provided by the home device. Then, the electronic device receives a random code from the home device. The random code is sent by the home device by using the first antenna. The electronic device accesses the wireless local area network based on the random code, and obtains configuration information of the home device, and the configuration information includes an interface element of a control page and a control instruction that are used to control the home device. Finally, the electronic device displays the control page of the home device, interacts with a user by using the control page, and sends the control instruction to the home device through the wireless local area network, so as to control the home device.

According to the home device control method provided in this application, the electronic device touches the home device, so that the home device may be controlled to use the first antenna, and the electronic device is automatically connected to the home device. In this way, the electronic device may obtain the configuration information of the home device from the home device, and display the control page of the home device, to control the home device.

It should be noted that the method in this application is not only applicable to a home device that is configured with a network and registered, but also applicable to a home device that is not configured with a network or registered. That is, regardless of whether the home device is configured with a network and registered, the electronic device can control the home device by using this solution. In this way, a home device control process can be simplified, and use experience of the home device can be improved.

The method provided in this application is particularly applicable to some users who are unfamiliar with a network configuration and registration process of a home device. For such users, the use experience of the home device is improved by using the foregoing solution in which the electronic device can control the home device only by holding the electronic device to touch the home device.

In a possible design manner of the second aspect, that the electronic device detects that the home device meets the preset condition further includes: Signal strength of the N first messages is greater than a first strength threshold, and/or the home device that broadcasts the first messages supports a preset home service.

In another possible design manner of the second aspect, before the electronic device detects that the home device meets the preset condition, the method in this application may further include: sending first prompt information after the electronic device receives one first message broadcast by the home device that supports a preset home service. The first prompt information is used to indicate the user to move the electronic device close to the home device in a preset manner.

The preset manner includes: moving the electronic device close to the home device, to keep a distance between the electronic device and the home device within the first distance for at least second preset duration, where the second preset duration is greater than or equal to the first preset duration.

In another possible design manner of the second aspect, the preset manner specifically includes: moving the electronic device close to and then away from the home device M times within the second preset duration, where a distance between the electronic device and the home device is within the first distance.

That the electronic device detects that the home device meets the preset condition further includes: Signal strength of the N first messages changes M times under a preset fluctuation condition; and a change under the preset fluctuation condition is that: After signal strength of one or more first messages received by the electronic device is greater than a second strength threshold, the signal strength of the one or more first messages received by the electronic device is less than a third strength threshold. The second strength threshold is greater than the third strength threshold, the second strength threshold is greater than the first strength threshold, and the first strength threshold is greater than or equal to the third strength threshold.

In another possible design manner of the second aspect, the wireless local area network is an encrypted wireless local area network, the random code is an access password of the wireless local area network, and the first messages includes an SSID of the wireless local area network.

That the electronic device accesses the wireless local area network based on the random code includes: The electronic device accesses the wireless local area network based on the SSID and the access password.

In another possible design manner of the second aspect, the wireless local area network is an encrypted wireless local area network; the first messages includes an SSID and an access password of the wireless local area network; and the random code is used to perform identity authentication on a device that requests to access the wireless local area network.

That the electronic device accesses the wireless local area network based on the random code includes: The electronic device requests to access the wireless local area network based on the SSID, the access password, and the random code.

In another possible design manner of the second aspect, the wireless local area network is an unencrypted wireless local area network; and the first messages includes an SSID of the wireless local area network.

That the electronic device accesses the wireless local area network based on the random code includes: The electronic device requests to access the wireless local area network based on the SSID and the random code.

In another possible design manner of the second aspect, that the electronic device obtains the configuration information of the home device includes: The electronic device obtains the configuration information of the home device from the home device through the wireless local area network; or the electronic device obtains capability information of the home device from the home device through the wireless local area network, and the electronic device obtains the configuration information of the home device from a cloud server based on the capability information of the home device. The capability information is used to indicate a device type of the home device.

In another possible design manner of the second aspect, that the electronic device displays the control page of the home device may include: The electronic device displays the control page by using a leftmost screen or a notification message; or the electronic device displays third prompt information for the control page by using a leftmost screen or a notification message, and the electronic device displays the control page in response to a tap operation performed by the user on the third prompt information.

It may be understood that, for beneficial effects that can be achieved by the method in any possible design manner of the second aspect of this application, refer to beneficial effects in the possible design manner of the first aspect. Details are not described herein again.

According to a third aspect, this application provides a home device control method, and the method may be used by an electronic device to control a home device. The home device includes a first antenna and a second antenna, a transmitting distance of the first antenna is a first distance, and a transmitting distance of the second antenna is a second distance. The first distance is less than the second distance.

In the method, the home device may broadcast first messages. After the home device broadcasts the first messages, the electronic device may detect that the home device meets a preset condition. That the electronic device detects that the home device meets the preset condition includes:

The electronic device receives, within first preset duration, N first messages broadcast by the home device. After detecting that the home device meets the preset condition, the electronic device may send a second message to the home device.

Then, the home device may receive the second message from the electronic device. The second message is used to indicate the home device to use the first antenna and is used to indicate to obtain a random code from the home device, and the random code is used to access a wireless local area network provided by the home device. Then, the home device sends the random code to the electronic device by using the first antenna, and provides the wireless local area network by using the first antenna. Finally, the home device receives an access request from the electronic device, and accesses the wireless local area network based on the access request by using the electronic device. The access request includes a service set identifier SSID of the wireless local area network and the random code. The home device receives a control instruction from the electronic device through the wireless local area network, and accepts control of the electronic device.

In a possible design manner of the third aspect, that the home device broadcasts the first messages includes: The home device periodically switches between the first antenna and the second antenna for use, and broadcasts the first messages when the home device uses the first antenna.

That the second message is used to indicate the home device to use the first antenna specifically includes: The second message is used to indicate the home device to stop switching between the first antenna and the second antenna for use, and use the first antenna.

In another possible design manner of the third aspect, the wireless local area network is an encrypted wireless local area network, the random code is an access password of the wireless local area network, and the first message includes the SSID.

That the home device accesses the wireless local area network based on the access request by using the electronic device includes: If the SSID and the access password in the access request are correct, the home device allows the electronic device to access the wireless local area network.

In another possible design manner of the third aspect, the wireless local area network is an encrypted wireless local area network; the first message includes the SSID and an access password of the wireless local area network, the random code is used to perform identity authentication on a device that requests to access the wireless local area network, and the access request further includes the access password.

That the home device accesses the wireless local area network based on the access request by using the electronic device includes:

If the random code in the access request is the random code sent by the home device to the electronic device, and the SSID and the access password in the access request are correct, the home device allows the electronic device to access the wireless local area network.

In another possible design manner of the third aspect, the wireless local area network is an unencrypted wireless local area network; and the access request includes the SSID.

That the home device accesses the wireless local area network based on the access request by using the electronic device includes: If the random code in the access request is the random code sent by the home device to the electronic device, and the SSID in the access request is correct, the home device allows the electronic device to access the wireless local area network.

In another possible design manner of the third aspect, before the home device accesses the wireless local area network based on the access request by using the electronic device, the method in this application further includes: The home device determines that the random code is within a validity period.

In another possible design manner of the third aspect, before the home device receives the control instruction from the electronic device through the wireless local area network, and accepts the control of the electronic device, the method in this application further includes: The home device sends the configuration information of the home device to the electronic device through the wireless local area network by using the first antenna; or the home device sends capability information of the home device to the electronic device through the wireless local area network by using the first antenna. The capability information is used to obtain the configuration information of the home device from a cloud server, and the capability information is used to indicate a device type of the home device.

The configuration information includes an interface element of a control page and the control instruction that are used to control the home device, and the control page is used to interact with a user to trigger the electronic device to send the control instruction to the home device.

In another possible design manner of the third aspect, before the home device sends the configuration information of the home device or capability information of the home device to the electronic device through the wireless local area network by using the first antenna, the method in this application further includes: The home device performs an authorization determination on the electronic device, so as to determine whether the electronic device has permission to obtain the configuration information or the capability information; and if the authorization determination succeeds, the home device sends the configuration information or the capability information to the electronic device.

In another possible design manner of the third aspect, that the home device receives the control instruction from the electronic device through the wireless local area network, and accepts the control of the electronic device includes: The home device receives the control instruction through the wireless local area network by using the second antenna, and accepts the control of the electronic device.

It may be understood that, for beneficial effects that can be achieved by the method in any one of the third aspect or the possible design manner of the third aspect of this application, refer to beneficial effects in any one of the first aspect and the possible design manner of the first aspect. Details are not described herein again.

According to a fourth aspect, this application provides a home device control method, and the method may be used by an electronic device to control a home device by using a remote control of the home device. The remote control includes a first antenna and a second antenna, a transmitting distance of the first antenna is a first distance, and a transmitting distance of the second antenna is a second distance. The first distance is less than the second distance.

In the method, the remote control may broadcast first messages. After the remote control broadcasts the first messages, the electronic device may detect that the remote control meets a preset condition. That the electronic device detects that the remote control meets the preset condition includes: The electronic device receives, within first preset duration, N first messages broadcast by the remote control. Then, the electronic device sends a second message to the remote control when the electronic device detects that the remote control meets the preset condition. The second message is used to indicate the remote control to use the first antenna and is used to indicate to obtain a random code from the remote control, and the random code is used to access a wireless local area network provided by the remote control. The remote control may receive the second message from the electronic device, send the random code to the electronic device by using the first antenna, and provide the wireless local area network by using the first antenna. Then, the electronic device accesses the wireless local area network based on the random code, and obtains configuration information of the home device from the remote control. The configuration information includes an interface element of a control page and a control instruction that are used to control the home device. Finally, the electronic device displays the control page of the home device, interacts with a user by using the control page, and sends the control instruction to the home device through the wireless local area network by using the remote control, so as to control the home device.

According to the home device control method provided in this embodiment of this application, the electronic device touches the remote control of the home device, so that the remote control may be controlled to use the first antenna, and the electronic device is automatically connected to the remote control. The electronic device may obtain the configuration information of the home device from the remote control, and display the control page of the home device, to control the home device.

The method in this embodiment of this application is not only applicable to a home device that is configured with a network and registered, but also applicable to a home device that is not configured with a network or registered. That is, regardless of whether the home device is configured with a network and registered, the electronic device can control the home device by using this solution. In this way, a home device control process can be simplified, and use experience of the home device can be improved.

The method provided in this application is particularly applicable to some users who are unfamiliar with a network configuration and registration process of a home device. For such users, the use experience of the home device is improved by using the foregoing solution in which the electronic device can control the home device only by holding the electronic device to touch the home device.

In another possible design manner of the fourth aspect, that the remote control detects that the home device meets the preset condition further includes: Signal strength of the N first messages is greater than a first strength threshold, and/or the remote control that broadcasts the first messages supports a preset home service.

In another possible design manner of the fourth aspect, before the electronic device detects that the remote control meets the preset condition, the method in this application further includes: sending first prompt information after the electronic device receives one first message broadcast by the remote control of the home device that supports the preset home service, where the first prompt information is used to indicate the user to move the electronic device close to the remote control in a preset manner.

The preset manner includes: moving the electronic device close to the remote control, to keep a distance between the electronic device and the remote control within the first distance for at least second preset duration. The second preset duration is greater than or equal to the first preset duration.

In another possible design manner of the fourth aspect, the preset manner specifically includes: The electronic device moves close to and then away from the remote control M times within the second preset duration, and the distance between the electronic device and the remote control is within the first distance.

That the electronic device detects that the remote control meets the preset condition further includes: The signal strength of the N first messages changes M times under a preset fluctuation condition; and a change under the preset fluctuation condition is that: After signal strength of one or more first messages received by the electronic device is greater than a second strength threshold, the signal strength of the one or more first messages received by the electronic device is less than a third strength threshold. The second strength threshold is greater than the third strength threshold, the second strength threshold is greater than the first strength threshold, and the first strength threshold is greater than or equal to the third strength threshold.

In another possible design manner of the fourth aspect, that the remote control broadcasts the first messages includes: The remote control periodically switches between the first antenna and the second antenna for use, and broadcasts the first messages when the remote control uses the first antenna. That the second message is used to indicate the remote control to use the first antenna specifically includes: The second message is used to indicate the remote control to stop switching between the first antenna and the second antenna for use, and use the first antenna.

In another possible design manner of the fourth aspect, the wireless local area network is an encrypted wireless local area network, the random code is an access password of the wireless local area network, and the first message includes an SSID of the wireless local area network. That the electronic device accesses the wireless local area network based on the random code includes: The electronic device accesses the wireless local area network based on the SSID and the access password. The method further includes: If the SSID and the access password are correct, the remote control allows the electronic device to access the wireless local area network.

In another possible design manner of the fourth aspect, the wireless local area network is an encrypted wireless local area network; the first message includes an SSID and an access password of the wireless local area network; and the random code is used to perform identity authentication on a device that requests to access the wireless local area network. That the electronic device accesses the wireless local area network based on the random code includes: The electronic device requests to access the wireless local area network based on the SSID, the access password, and the random code. The method further includes: If the random code is the random code sent by the remote control to the electronic device, and the SSID and the access password are correct, the remote control allows the electronic device to access the wireless local area network.

In another possible design manner of the fourth aspect, the wireless local area network is an unencrypted wireless local area network. That the electronic device accesses the wireless local area network based on the random code includes: The electronic device requests to access the wireless local area network based on the SSID and the random code. The method further includes: If the random code is the random code sent by the remote control to the electronic device, and the SSID is correct, the remote control allows the electronic device to access the wireless local area network.

In another possible design manner of the fourth aspect, before the remote control allows the electronic device to access the wireless local area network, the method further includes: The remote control determines that the random code is within a validity period.

In another possible design manner of the fourth aspect, that the electronic device obtains the configuration information of the home device from the remote control includes: The electronic device obtains the configuration information of the home device from the remote control through the wireless local area network; or the electronic device obtains capability information of the home device from the remote control through the wireless local area network, and the electronic device obtains the configuration information of the home device from a cloud server based on the capability information of the home device. The capability information is used to indicate a device type of the home device. The remote control sends the configuration information or the capability information to the electronic device by using the first antenna.

In another possible design manner of the fourth aspect, before the remote control sends the configuration information or the capability information to the electronic device by using the first antenna, the method in this application further includes: The remote control performs an authorization determination on the electronic device, so as to determine whether the electronic device has permission to obtain the configuration information or the capability information; and if the authorization determination succeeds, the remote control sends the configuration information or the capability information to the electronic device.

In another possible design manner of the fourth aspect, the method further includes: The remote control receives the control instruction through the wireless local area network by using the second antenna.

It may be understood that, for beneficial effects that can be achieved by the method provided in any possible design manner of the fourth aspect of this application, refer to beneficial effects in the possible design manner of the first aspect. Details are not described herein again.

According to a fifth aspect, this application provides an electronic device. The electronic device includes a memory, a display, a communications module, and one or more processors. The memory, the display, and the communications module are coupled to the processor.

The display is configured to display an image or an interface generated by the processor. The communications module is configured to communicate with another terminal. The memory is configured to store data in the electronic device. The memory is further configured to store computer program code, and the computer program code includes computer instructions. When the computer instructions are executed by the processor, the electronic device is enabled to perform the method performed by the electronic device in any one of the first aspect, the second aspect, the third aspect, or the fourth aspect and the possible design manners thereof.

According to a sixth aspect, this application provides a home device. The home device may be the home device in the first aspect, the second aspect, or the third aspect. The home device includes a first antenna and a second antenna, a transmitting distance of the first antenna is a first distance, a transmitting distance of the second antenna is a second distance, and the first distance is less than the second distance.

The home device includes a memory, a communications module, and one or more processors. The communications module includes the first antenna and the second antenna, the transmitting distance of the first antenna is the first distance, the transmitting distance of the second antenna is the second distance, and the first distance is less than the second distance. The memory and the communications module are coupled to the processor, the communications module is configured to communicate with another device, and the memory is configured to store data in the home device. The memory is further configured to store computer program code, and the computer program code includes computer instructions. When the computer instructions are executed by the processor, the home device is enabled to perform the method performed by the home device in any one of the first aspect, the second aspect, or the third aspect and the possible design manners thereof.

According to a seventh aspect, this application provides a remote control of a home device. The remote control may be the remote control in the fourth aspect. The remote control includes a first antenna and a second antenna, a transmitting distance of the first antenna is a first distance, a transmitting distance of the second antenna is a second distance, and the first distance is less than the second distance.

The remote control includes a memory, a communications module, and one or more processors. The communications module includes the first antenna and the second antenna, the transmitting distance of the first antenna is the first distance, the transmitting distance of the second antenna is the second distance, and the first distance is less than the second distance. The memory and the communications module are coupled to the processor, the communications module is configured to communicate with another device, and the memory is configured to store data in the home device. The memory is further configured to store computer program code, and the computer program code includes computer instructions. When the computer instructions are executed by the processor, the remote control is enabled to perform the method performed by the remote control in any one of the fourth aspect and the possible design manner of the fourth aspect.

According to an eighth aspect, an embodiment of this application provides a chip system, and the chip system is applied to an electronic device including a display, a communications module, and a memory. The chip system includes one or more interface circuits and one or more processors. The interface circuit and the processor are connected through a line. The interface circuit is configured to receive a signal from the memory of the electronic device, and send the signal to the processor. The signal includes computer instructions stored in the memory. When the computer instructions are executed by the processor, the electronic device performs the method performed by the electronic device in any one of the first aspect, the second aspect, the fourth aspect, or the third aspect and the possible design manners thereof.

According to a ninth aspect, an embodiment of this application provides a chip system, and the chip system is applied to a home device including a communications module and a memory. The communications module includes a first antenna and a second antenna, a transmitting distance of the first antenna is a first distance, a transmitting distance of the second antenna is a second distance, and the first distance is less than the second distance. The chip system includes one or more interface circuits and one or more processors. The interface circuit and the processor are connected through a line. The interface circuit is configured to receive a signal from the memory of the home device, and send the signal to the processor. The signal includes computer instructions stored in the memory. When the computer instructions are executed by the processor, the home device performs the method performed by the home device in any one of the first aspect, the second aspect, or the third aspect and the possible design manners thereof.

According to a tenth aspect, an embodiment of this application provides a chip system, and the chip system is applied to a remote control including a communications module and a memory. The communications module includes a first antenna and a second antenna, a transmitting distance of the first antenna is a first distance, a transmitting distance of the second antenna is a second distance, and the first distance is less than the second distance. The chip system includes one or more interface circuits and one or more processors. The interface circuit and the processor are connected through a line. The interface circuit is configured to receive a signal from the memory of the remote control, and send the signal to the processor. The signal includes computer instructions stored in the memory. When the computer instructions are executed by the processor, the remote control performs the method performed by the remote control in any one of the fourth aspect and the possible design manner of the fourth aspect.

According to an eleventh aspect, an embodiment of this application provides a computer storage medium, and the computer storage medium includes computer instructions. When the computer instruction is run on a device, the device is enabled to perform the method in any one of the first aspect, the second aspect, the third aspect, or the fourth aspect and the possible design manners thereof. The device may be the electronic device, the home device, or the remote control described above.

According to a twelfth aspect, an embodiment of this application provides a computer program product. When the computer program product is run on a computer, the computer is enabled to perform the method in any one of the first aspect, the second aspect, the third aspect, or the fourth aspect and the possible design manners thereof. The computer may be the electronic device, the home device, or the remote control described above.

It may be understood that, for beneficial effects that can be achieved by the electronic device in the fifth aspect, the home device in the sixth aspect, the remote control in the seventh aspect, the chip system in the eighth aspect, the ninth aspect, and the tenth aspect, the computer storage medium in the eleventh aspect, and the computer program product in the twelfth aspect, refer to the beneficial effects in any one of the first aspect and the possible design manner of the first aspect. Details are not described herein again.

DESCRIPTION OF EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise stated, "a plurality of" means two or more than two.

Embodiments of this application provide a home device control method. In this method, regardless of whether a home device is configured with a network and registered, an electronic device can control the home device, so that a home device control process can be simplified, and use experience of the home device can be improved.

Figure 1:
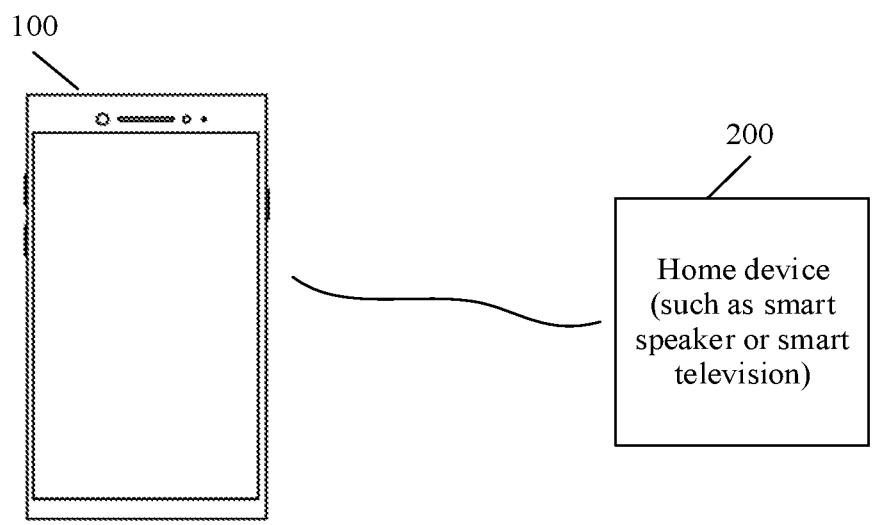
FIG. 1 is a schematic diagram of a communications system applied to a home device control method according to an embodiment of this application.

FIG. 1 is a schematic diagram of a communications system applied to a home device control method according to an embodiment of this application. As shown in FIG. 1, the communications system may include an electronic device 100 (for example, a mobile phone) and a home device 200.

A first APP (also referred to as a smart home APP, a home APP, or a management APP) used to manage a home device may be installed in the electronic device 100. The electronic device 100 may control a home device by using the first APP. The electronic device 100 may further support batch network configuration and registration of a plurality of home devices 200 by using the first APP. Certainly, the first APP may not be installed in the electronic device 100. Regardless of whether the first APP is installed in the electronic device 100, according to the method in embodiments of this application, the electronic device 100 can control the home device even if the home device is not configured with a network or registered. In this way, a home device control process can be simplified, and use experience of the home device can be improved.

For example, the home device 200 may be any smart home device such as a smart air conditioner, a smart acoustic device, a smart light bulb, a smart television, a smart camera, a smart fan, an electric cooker, or a body fat scale. A specific form of the home device 200 is not limited herein in this embodiment of this application.

For example, the electronic device in this embodiment of this application may be a device including a display and a short-range communications module, such as a mobile phone, a tablet computer, a laptop computer, a wearable device (for example, a smart watch), a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR) or virtual reality (virtual reality, VR) device. A specific form of the electronic device is not specifically limited in this embodiment of this application. The sound box may be a smart speaker.

Figure 2:
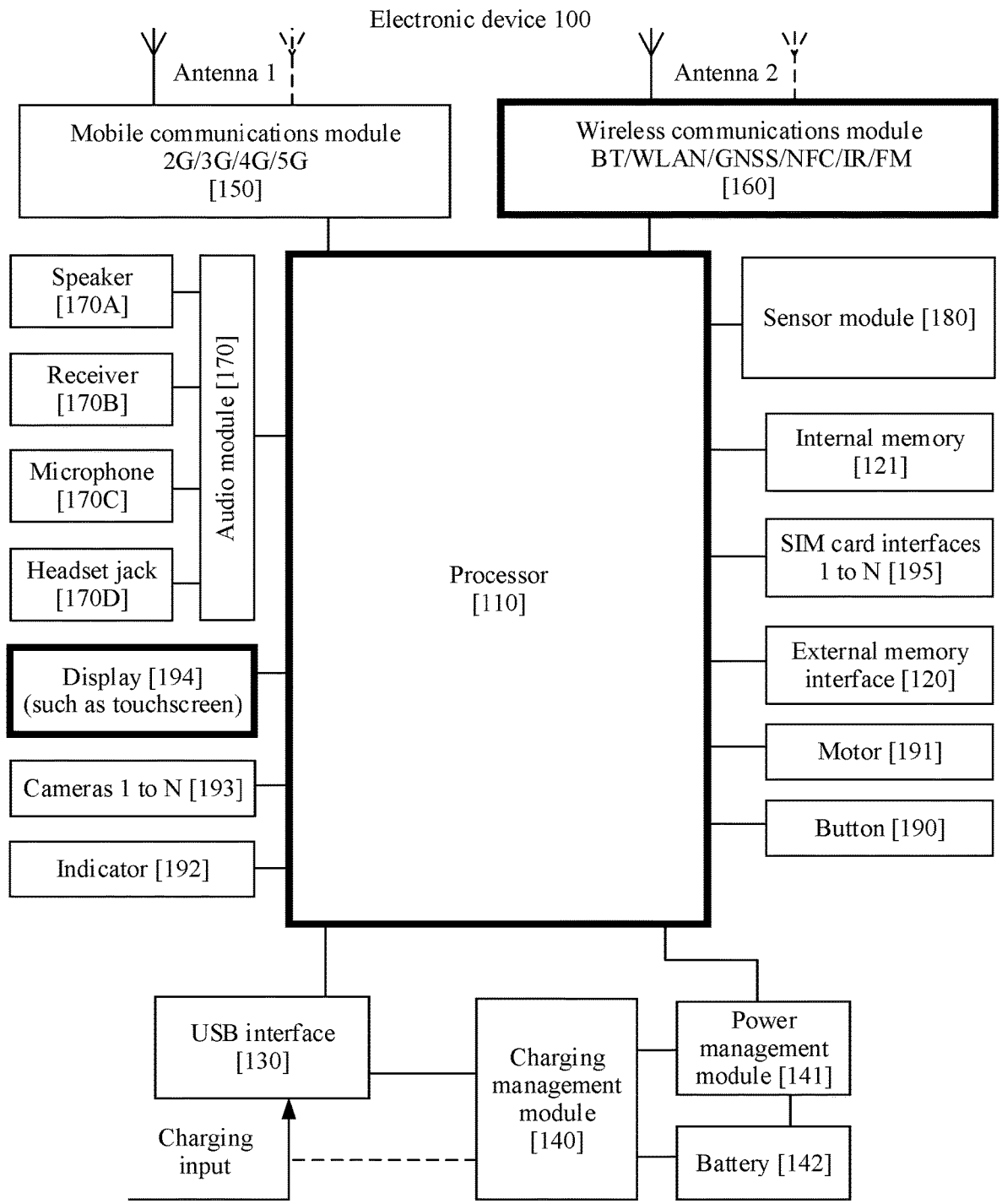
FIG. 2 is a schematic diagram of a hardware structure of a mobile phone according to an embodiment of this application.

In this embodiment of this application, an example in which the device 100 shown in FIG. 1 is a mobile phone is used to describe a structure of the electronic device provided in this embodiment of this application. As shown in FIG. 2, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules shown in this embodiment is merely used as an example for description, and does not constitute a limitation on a structure of the electronic device 100. In some other embodiments, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like. The power management module 141 may further be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communication module 150 may include at least one filter, a switch, a power amplifier, a low noise amplifier (low noise amplifier, LNA), and the like. The antenna 1 of the electronic device 100 is coupled to the mobile communications module 150. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules of the mobile communications module 150 may be disposed in a same device as at least some modules of the processor 110.

The wireless communications module 160 may provide a solution, applied to the electronic device 100, to wireless communication including a wireless local area network (wireless local area networks, WLAN), Bluetooth (bluetooth, BT), a global navigation satellite system (global navigation satellite system, GNSS), frequency modulation (frequency modulation, FM), near field communication (near field communication, NFC), infrared technology (infrared, IR), and the like. For example, the WLAN may be a wireless fidelity (wireless fidelity, Wi-Fi) network.

The antenna 2 of the electronic device 100 is coupled to the wireless communications module 160. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information. The display 194 may be a touchscreen, and the display 194 is configured to display an image, a video, and the like. The display 194 includes a display panel.

The electronic device 100 may implement a photographing function through the camera 193, the ISP, the video codec, the GPU, the display 194, the application processor and the like. The ISP is configured to process data fed back by the camera 193. In some embodiments, the ISP may be disposed in the camera 193. The camera 193 is configured to capture a static image or a video. In some embodiments, the electronic device 100 may include one or N cameras 193, where N is a positive integer greater than 1.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. For example, in this embodiment of this application, the processor 110 may execute the instructions stored in the internal memory 121, and the internal memory 121 may include a program storage area and a data storage area.

The program storage area may store an operating system, an application required by at least one function (for example, a sound playing function or an image playing function), and the like. The data storage area may store data (for example, audio data and a phone book) and the like created when the electronic device 100 is used. In addition, the internal memory 121 may include a high-speed random access memory, or may include a nonvolatile memory such as at least one disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like.

Figure 3:
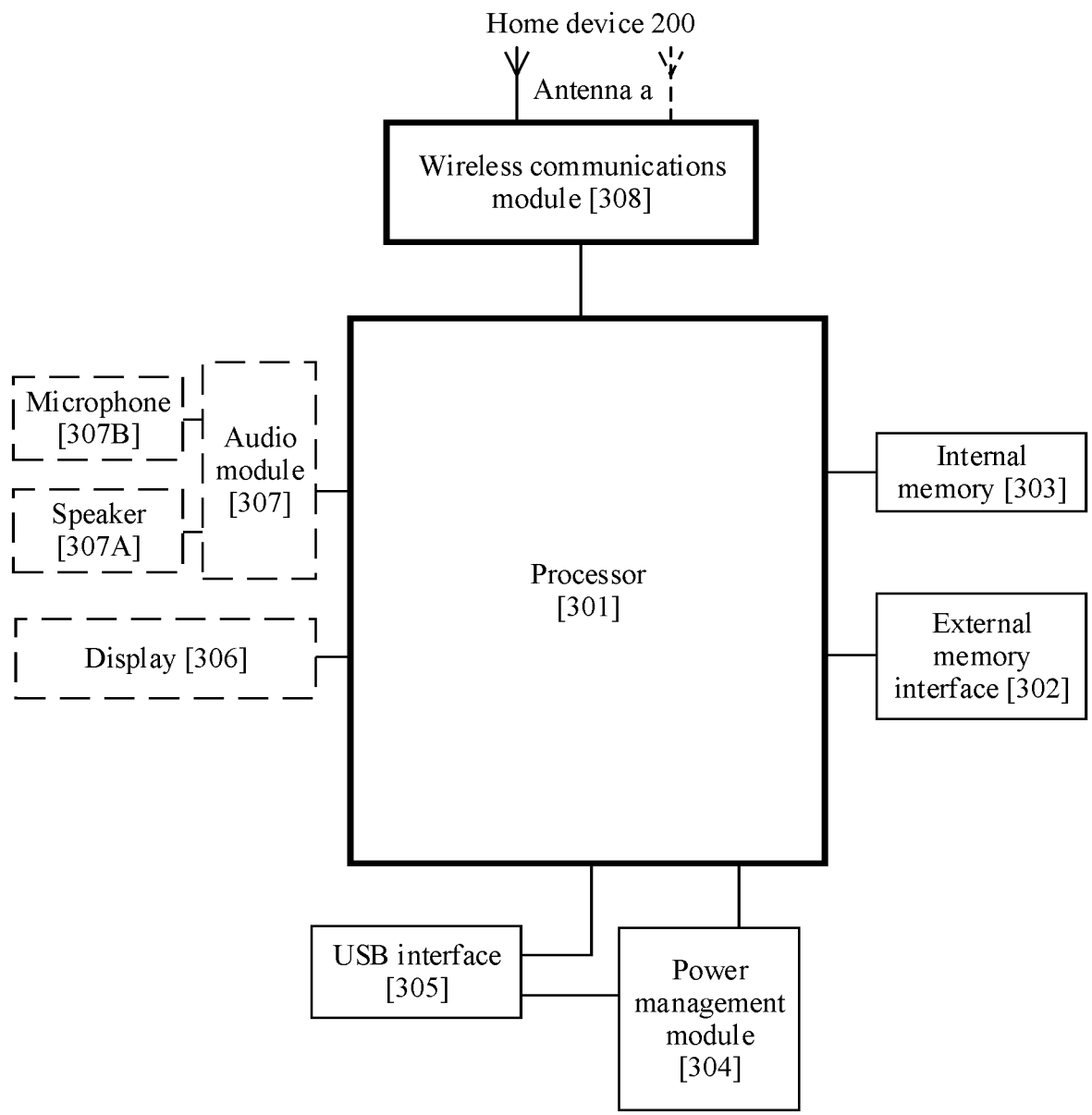
FIG. 3 is a schematic diagram of a hardware structure of a home device according to an embodiment of this application.

FIG. 3 is a schematic diagram of a structure of an electronic device 200 according to an embodiment of this application. As shown in FIG. 3, the home device 200 may include a processor 301, an external memory interface 302, an internal memory 303, a USB interface 305, a power management module 304, an antenna a, a wireless communications module 308, and another function module. The another function module is configured to implement a related function of the home device 200. For example, the smart speaker may include an audio module 307, a loudspeaker 307A, a display 306, and the like. The smart television may also include an audio module 307, a loudspeaker 307A, a display 306, and the like. For another example, the smart air conditioner may include a cooling module and the like, and the smart light bulb may include a light emitting module and the like.

The processor 301 may include one or more processing units. For example, the processor 301 may include an AP, a modem processor, a GPU, an ISP, a controller, a memory, a video codec, a DSP, a baseband processor, and/or an NPU. Different processing units may be independent components, or may be integrated into one or more processors. A memory may be further disposed in the processor 301, and is configured to store instructions and data.

The power management module 304 is configured to connect to a power supply. The power management module 304 may be further connected to the processor 301, the internal memory 303, the display 306, the wireless communications module 308, and the like. The power management module 304 receives an input of the power supply through the USB interface 305, and supplies power to the processor 301, the internal memory 303, the display 306, the wireless communications module 308, and the like. In some embodiments, the power management module 304 may alternatively be disposed in the processor 301.

A wireless communication function of the home device 200 may be implemented by using the antenna, the wireless communications module 308, and the like. The wireless communications module 308 may provide a wireless communication solution that is applied to the home device 200 and that includes a WLAN (for example, a Wi-Fi network), Bluetooth (BT), a GNSS, or the like.

The wireless communications module 308 may be one or more components integrating at least one communications processing module. The wireless communications module 308 receives an electromagnetic wave through the antenna a, performs frequency modulation and filtering processing on an electromagnetic wave signal, and sends a processed signal to the processor 301. The wireless communications module 308 may further receive a to-be-sent signal from the processor 301, perform frequency modulation and amplification on the signal, and convert a processed signal into an electromagnetic wave for radiation through the antenna. In some embodiments, the antenna a of the home device 200 is coupled to the wireless communications module 308, so that the home device 200 may communicate with a network and another device by using a wireless communications technology. For example, the wireless communications module 308 in this embodiment of this application may be a Bluetooth module or a Wi-Fi module. The wireless communications module 308 is configured to perform data transmission with devices such as the electronic device 100, a router 120, and a cloud server 130.

Figure 4A:
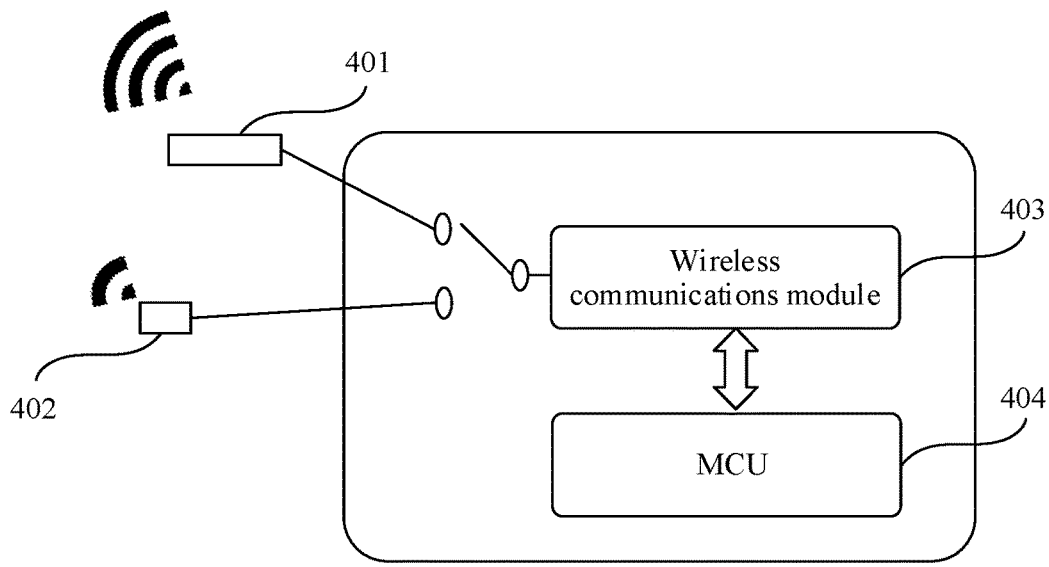
FIG. 4A is a schematic diagram of a structure of an antenna and a related component according to an embodiment of this application.

The antenna a may include one or more antennas. The one or more antennas may be classified into a first antenna (that is, an ultra-short-haul antenna, also referred to as a weak antenna) and a second antenna (that is, a normal antenna, also referred to as a strong antenna). A transmitting distance (for example, a first distance) for transmitting a wireless signal by the first antenna is less than a transmitting distance (for example, a second distance) for transmitting a wireless signal by the second antenna. The second antenna and the first antenna may be switched. The second antenna and the first antenna implement network communication with another device (for example, a mobile phone) by using a wireless communications module on the home device 200. FIG. 4A is a schematic diagram of a structure of an antenna in a home device 200 according to an embodiment of this application.

In an example, the second antenna and the first antenna may be two different antennas. The home device 200 shown in FIG. 3 may be an electronic device 40 (for example, a sound box) shown in FIG. 4A. The electronic device 40 may include a microcontroller unit (microcontroller unit, MCU) 404, a wireless communications module 403, an antenna 401, and an antenna 402.

The antenna 401 shown in FIG. 4A is the second antenna, and the antenna 402 is the first antenna. The antenna a shown in FIG. 3 may include the antenna 401 and the antenna 402 shown in FIG. 4A. The wireless communications module 308 shown in FIG. 3 may be the wireless communications module 403 shown in FIG. 4A. The MCU 404 shown in FIG. 4A may be implemented by the processor 301 in FIG. 3. The wireless communications module 403 may be a Wi-Fi chip, and a radio frequency input/output (radio frequency input/output, RFIO) pin of the wireless communications module 403 is connected to the antenna 401 or the antenna 402 by using a single pole double throw switch.

The MCU 404 may include a central processing unit, a memory, a counter, a clock, an interrupt, a serial peripheral interface (serial peripheral interface, SPI), a UART interface, a universal serial bus interface, and the like. The UART interface is a universal serial data bus, and is configured to perform asynchronous communication. The bus may be a two-way communications bus, and converts to-be-transmitted data between serial communication and parallel communication.

In some embodiments, the MCU 404 exchanges information with the wireless communications module 403 by using the UART interface. The wireless communications module 403 is configured to implement wireless communication between the home device 200 and another device (for example, a mobile phone). For a detailed description of the wireless communications module 403, refer to the detailed description of the wireless communications module 308 in the foregoing embodiment. Details are not described herein again.

The antenna 401 and the antenna 402 may be configured to transmit and receive an electromagnetic wave. Further, the wireless communications module 403 may convert the electromagnetic wave received from the antenna 401 or the antenna 402 into a signal, and send the signal to the MCU 404 for processing. Alternatively, the wireless communications module 403 may receive a to-be-sent signal from the MCU 404, and convert the signal into an electromagnetic wave for radiation by using the antenna 401 or the antenna 402. In this embodiment of this application, the first distance for transmitting a signal by the antenna 401 is less than the second distance for transmitting a signal by the antenna 402.

In some embodiments, the MCU 404 may control switching between the antenna 401 and the antenna 402. When the home device 200 uses the antenna 401, if a distance between the home device 200 and another device (for example, a mobile phone) is less than the second distance, the another device (for example, the mobile phone) can receive a signal transmitted by the home device 200 by using the antenna 402, so as to implement communication between the another device and the home device 200. When the home device 200 uses the antenna 402, if a distance between the home device 200 and another device (for example, a mobile phone) is less than the first distance, the another device can receive a signal transmitted by the home device 200 by using the antenna 402, so as to implement communication between the another device and the home device 200.

For example, the home device 200 may send a first message or a second message to a surrounding device by using the antenna 401; and the home device 200 may receive, by using the antenna 402, an NAN publish message sent by another device. The home device 200 may further connect to a Wi-Fi router by using the antenna 401 or the antenna 402.

Figure 4B:
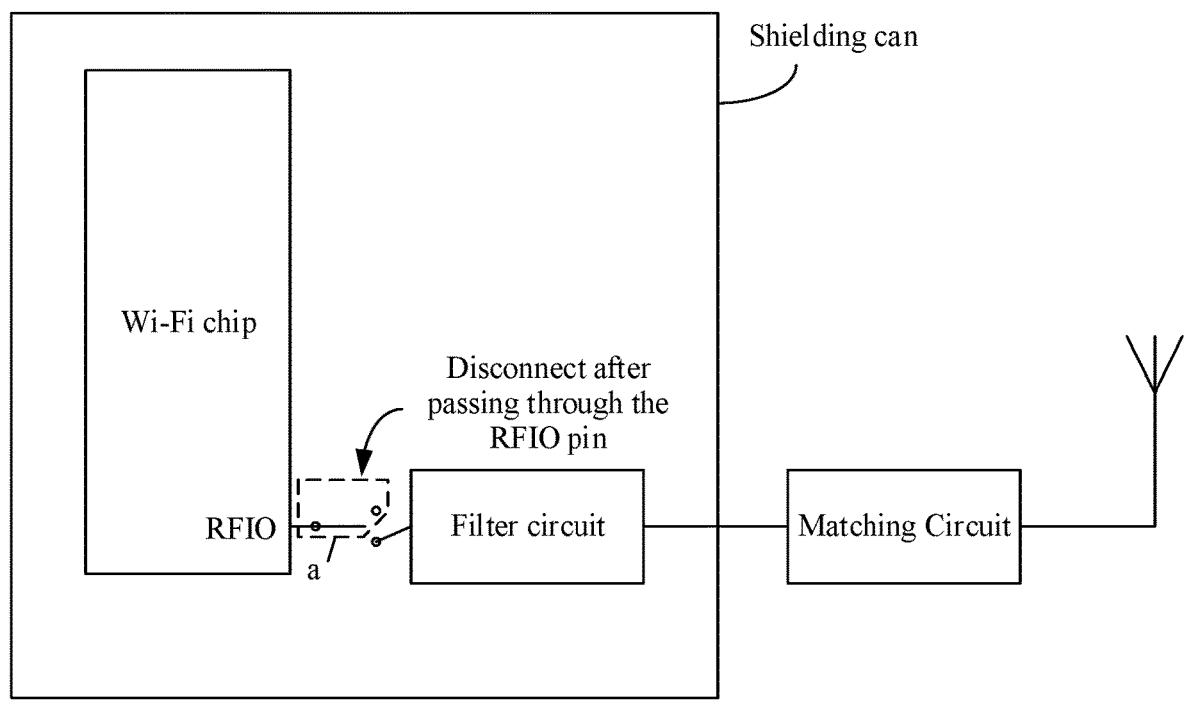
FIG. 4B is a schematic diagram of another structure of an antenna and a related component according to an embodiment of this application.
Figure 4C:
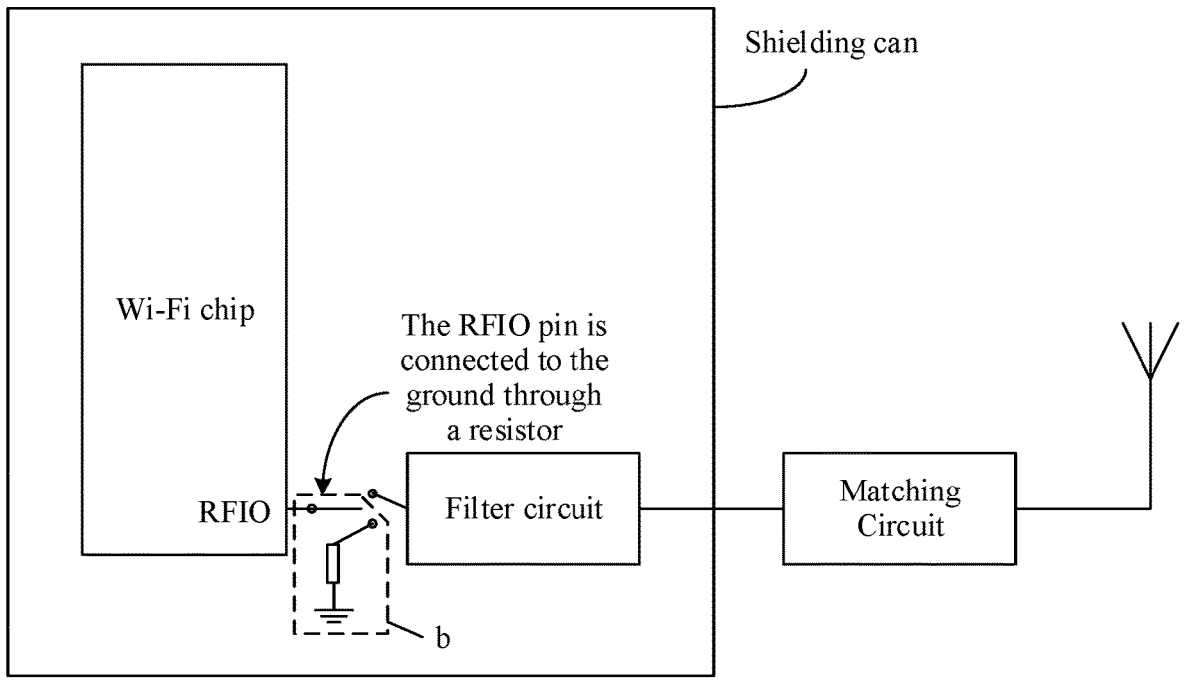
FIG. 4C is a schematic diagram of another structure of an antenna in a mobile phone according to an embodiment of this application.
Figure 4D:
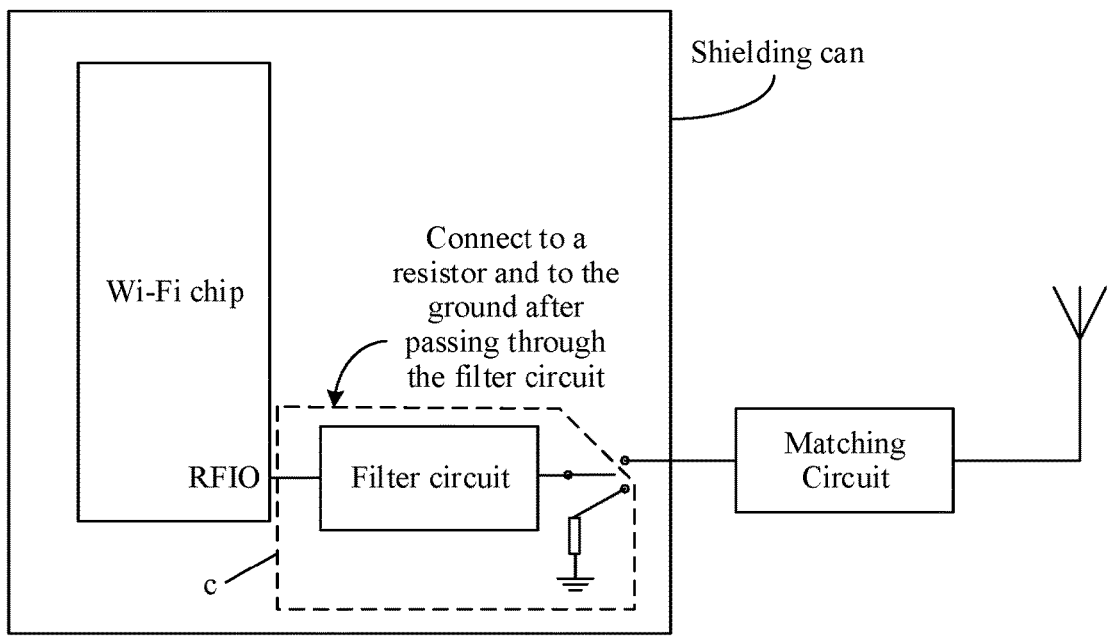
FIG. 4D is a schematic diagram of another structure of an antenna in a mobile phone according to an embodiment of this application.

In some other embodiments, the second antenna and the first antenna may share a part of cabling, for example, descriptions in embodiments shown in FIG. 4B to FIG. 4D.

In this embodiment of this application, the home device 200 implements ultra-short-haul communication by using the first antenna. In this embodiment of this application, the two antennas (the first antenna and the second antenna) in the home device 200 may be switched by using a radio frequency switch. Physically, both the first antenna and the radio frequency switch (the first antenna is shown in a dashed box in FIG. 4B to FIG. 4D) may be disposed in a shielding can, or the first antenna may be disposed in a chip. FIG. 4B to FIG. 4D are schematic diagrams of three structures of first antennas.

An objective of the first antenna in this embodiment of this application is to reduce a transmitting distance as much as possible. A principle of constructing the first antenna may be as follows:

(1) reducing a length of the antenna, to reduce an electromagnetic wave radiated to the air;

(2) reducing radiation efficiency, and converting, by using a resistor, a part of electromagnetic wave radiation into heat energy to be consumed; and (3) reducing a return loss and reflecting partial radio frequency energy back to the chip, and the like.

The first antenna may be specifically implemented through:

(1) shortening the antenna;

(2) disconnecting a point in a path of a physical antenna, or grounding the point through a resistor, an inductor, or a capacitor; and (3) using a shielding can, and the like.

It should be understood that specific implementations (1) and (2) of the first antenna may be implemented on a PCB board or inside a chip.

It should be further understood that a function of the shielding can is to block a path in which an electromagnetic wave is radiated by the antenna to the receiver, so as to achieve an objective of weakening radiation.

It should be further understood that the shortening the antenna means that the first antenna is shorter than the second antenna. Three structures of the first antenna are shown in FIG. 4B to FIG. 4D. The first antenna is shown in the dashed box in FIG. 4B to FIG. 4D. In a structure of the second antenna in FIG. 4B to FIG. 4D, a filter circuit (for example, a it-type circuit), a matching circuit (for example, a it-type circuit), and an antenna body (for example, the antenna body may be a metal cabling) outside the matching circuit are connected by using an RFIO pin. The first antenna a shown in the dashed box in FIG. 4B, the first antenna b shown in the dashed box in FIG. 4C, and the first antenna c shown in the dashed box in FIG. 4D have different lengths, but each are shorter than the second antenna. The filter circuit is configured to prevent interference, and the matching circuit is configured to match the second antenna.

For example, as shown in FIG. 4B, the first antenna a may be directly disconnected by using the radio frequency input/output (radio frequency input/output, RFIO) pin of the Wi-Fi chip in the shielding can. The first antenna a may include the RFIO pin, a cabling, and a first-way switch (the first-way switch is not connected to any component) in a two-way switch. The two-way switch refers to a switch between the RFIO pin and the filter circuit, and the RFIO pin may be connected to or disconnected from the filter circuit by using the switch. As shown in FIG. 4B, the first-way switch is the switch connected to the RFIO pin and disconnected from the filter circuit. It should be understood that the two-way switch in this embodiment of this application may be a single-pole double-throw switch.

For example, as shown in FIG. 4C, the first antenna b may be connected to the ground through a matching component (for example, a resistor) by using the RFIO of the Wi-Fi chip in the shielding can. The first antenna b may include the RFIO pin, a cabling, and a first-way switch (the first-way switch is connected to the resistor) in a two-way switch. A part of electromagnetic wave radiation may be converted, through the resistor grounding, into heat energy to be consumed, to reduce radiation efficiency of the first antenna b. The two-way switch refers to a switch between the RFIO pin and each of the resistor and the filter circuit. By using the switch, the RFIO pin may be connected to the resistor and disconnected from the filter circuit, or the RFIO pin may be disconnected from the resistor and connected to the filter circuit. The first-way switch is the switch connected to the resistor and disconnected from the filter circuit.

For example, as shown in FIG. 4D, the first antenna c may be connected to a matching component (for example, a resistor) after passing through a chip-matched filter circuit by using the RFIO pin of the Wi-Fi chip in the shielding can, and then to the ground. The first antenna c may include the RFIO pin, a cabling, the filter circuit, a first-way switch (the first-way switch is connected to the resistor) in a two-way switch, and the resistor. A part of electromagnetic wave radiation may be converted, through the resistor grounding, into heat energy to be consumed, to reduce radiation efficiency of the first antenna b. The two-way switch refers to a switch between the filter circuit and the resistor in the shielding can and the matching circuit outside the shielding can. By using the switch, the filter circuit and the resistor in the shielding can may be connected, and the filter circuit is disconnected from the matching circuit outside the shielding can; or the filter circuit and the resistor in the shielding can may be disconnected, and the filter circuit is connected to the matching circuit outside the shielding can. The first-way switch is the switch that connects the filter circuit and the resistor in the shielding can.

It should be understood that the second antenna in FIG. 4B and FIG. 4C may include the RFIO pin, a cabling, a second-way switch in the two-way switch, the filter circuit, the matching circuit, and an antenna body connected outside the matching circuit. The second-way switch is the switch that connects the RFIO pin and the filter circuit.

The second antenna in FIG. 4D may include the RFIO pin, the filter circuit, a cabling, a second-way switch in the two-way switch, the matching circuit, and an antenna body connected outside the matching circuit. The second-way switch is the switch that connects the filter circuit in the shielding can and the matching circuit outside the shielding can.

It should be understood that the wireless communications module 403 shown in FIG. 4A may be the Wi-Fi chip in FIG. 4B and FIG. 4C.

The foregoing different structures of first antennas cooperate with different transmit power (Tx power) of the Wi-Fi chip, so that different ultra-short-haul communication requirements (for example, from 10 cm to 2 m) can be met.

For example, Table 1 shows communication distances of several different structures of first antennas in cooperation with different transmit powers.

TABLE 1

| Antenna structure | Transmit power | |
| --- | --- | --- |
| | Distance at a maximum transmit power | Distance at a minimum transmit power |
| First antenna a | 1 m | 10 cm |
| First antenna b | 1.5 m | 50 cm |
| First antenna c | 2 m | 1 m |

Due to a characteristic of a physical component in the chip, a difference between the maximum transmit power and the minimum transmit power of the antenna is related. If a minimum transmit power of the home device 200 is reduced to a very low value, a maximum transmit power is also reduced. In this way, a distance requirement during normal working is not met. In this embodiment of this application, because different smart devices have different structures and have different security performance requirements, manufacturers of the smart devices may use different structures of first antennas and transmit powers to ensure a communication distance of the smart devices. For example, for manufacturers of different smart air conditioners, thicknesses of housings of the smart air conditioners may be different. In this case, when structures of first antennas and transmit powers are the same, communication distances at which the smart air conditioners can be discovered may also be different. Different smart device manufacturers may test and obtain, based on a structure of the smart device, a structure of the first antenna, and a specific transmit power, a safe distance at which the smart device is discovered.

Figure 4E:
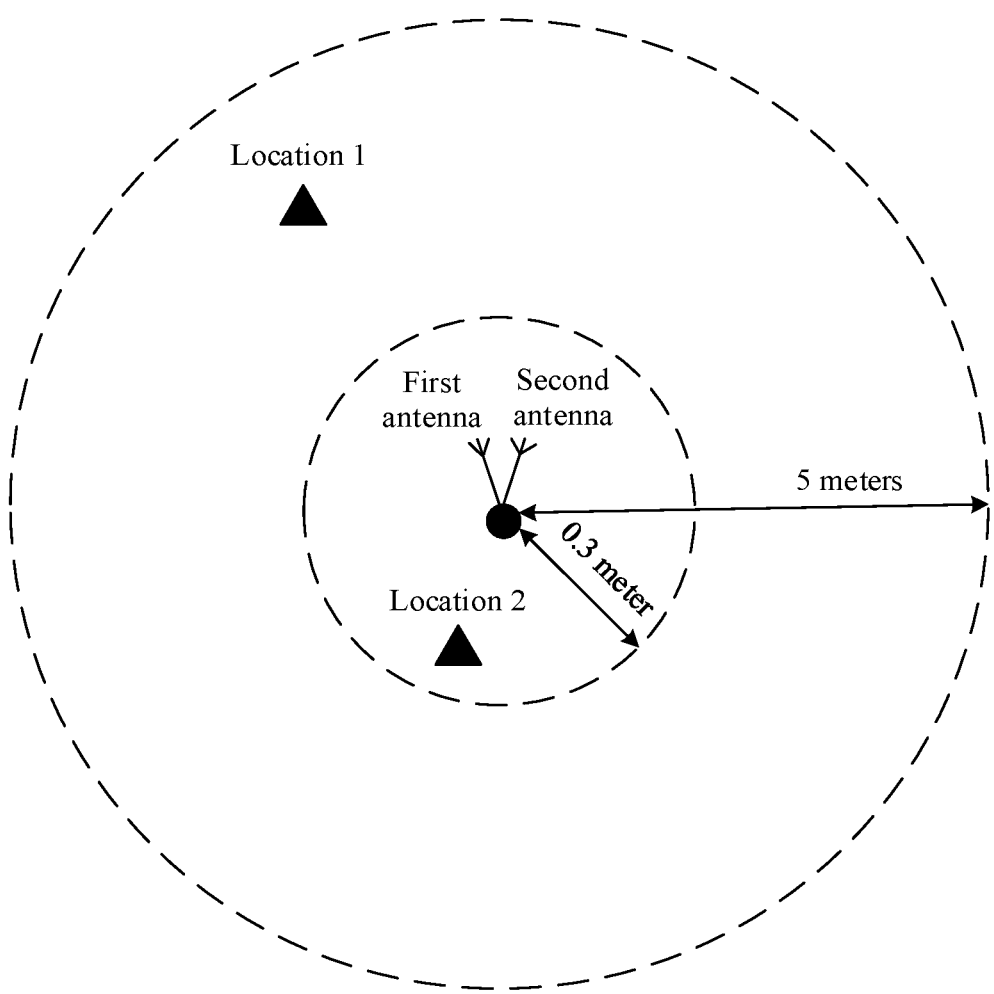
FIG. 4E is a schematic diagram of a transmitting distance of an antenna according to an embodiment of this application.

With reference to the foregoing example, an example in which the second distance is 5 meters and the first distance is 0.3 meter is used. When the home device 200 uses the second antenna (that is, the strong antenna), if a distance between the home device 200 and another device (for example, a mobile phone) is less than the second distance (for example, the another device is located at a location 1 shown in FIG. 4E), the home device 200 may communicate with another device (for example, a sound box). When the home device 200 uses the first antenna (that is, the weak antenna), if a distance between the home device 200 and another device (for example, a mobile phone) is less than the first distance (for example, the another device is located at a location 2 shown in FIG. 4E), the home device 200 may communicate with the another device (for example, the mobile phone).

The home device 200 may implement a display function by using a GPU, a display 306, an application processor, and the like. The GPU is a microprocessor for image processing, and is connected to the display 306 and the application processor. The GPU is configured to: perform mathematical and geometric computation, and render an image. The processor 301 may include one or more GPUs that execute program instructions to generate or change display information.

The display 306 is configured to display an image, a video, and the like. The display 306 includes a display panel. The display panel may be an LCD, an OLED, an AMOLED, an FLED, a mini-LED, a micro-LED, a micro-OLED, a QLED, or the like. For example, in this embodiment of this application, the display 306 may be configured to display image content corresponding to audio data played by the home device 200, an operation interface of the home device 200, and the like.

The video codec is configured to compress or decompress a digital video. The home device 200 may support one or more video codecs. In this way, the home device 200 may play or record videos in a plurality of encoding formats, for example, MPEG1, MPEG2, MPEG3, and MPEG4.

The internal memory 303 may be configured to store computer-executable program code. The executable program code includes instructions. The processor 301 runs the instructions stored in the internal memory 303, to perform various function applications of the home device 200 and data processing. The internal memory 303 may include a program storage area and a data storage area. The program storage area may store an operating system, an application required by at least one function (for example, a sound playing function or an image playing function), and the like. The data storage area may store data (for example, an audio playback record) and the like created when the home device 200 is used. In addition, the internal memory 303 may include a high-speed random access memory, or may include a nonvolatile memory, for example, at least one magnetic disk storage device, a flash memory, or a UFS.

The external memory interface 302 may be used to connect to an external storage card, for example, a micro SD card, to extend a storage capability of an advertising device 120. The external memory card communicates with the processor 301 through the external memory interface 302, to implement a data storage function. For example, files such as music and videos are stored in the external storage card.

The home device 200 may implement an audio function, for example, music playing and recording, and voice sampling, through the audio module 307, the speaker 307A, the microphone 407B, the application processor, and the like.

The audio module 307 is configured to convert digital audio information into an analog audio signal for output, and is also configured to convert analog audio input into a digital audio signal. The audio module 307 may be further configured to: code and decode an audio signal. In some embodiments, the audio module 307 may be disposed in the processor 301, or some function modules of the audio module 307 may be disposed in the processor 301. The speaker 307A, also referred to as a "loudspeaker", is configured to convert an audio electrical signal into a sound signal. The microphone 407B, also referred to as a "mike" or a "mic", is configured to collect a sound signal, and convert the sound signal into an electrical signal.

All the methods in the following embodiments may be implemented in the electronic device and the home device that have the foregoing hardware structure.

Figure 5A:
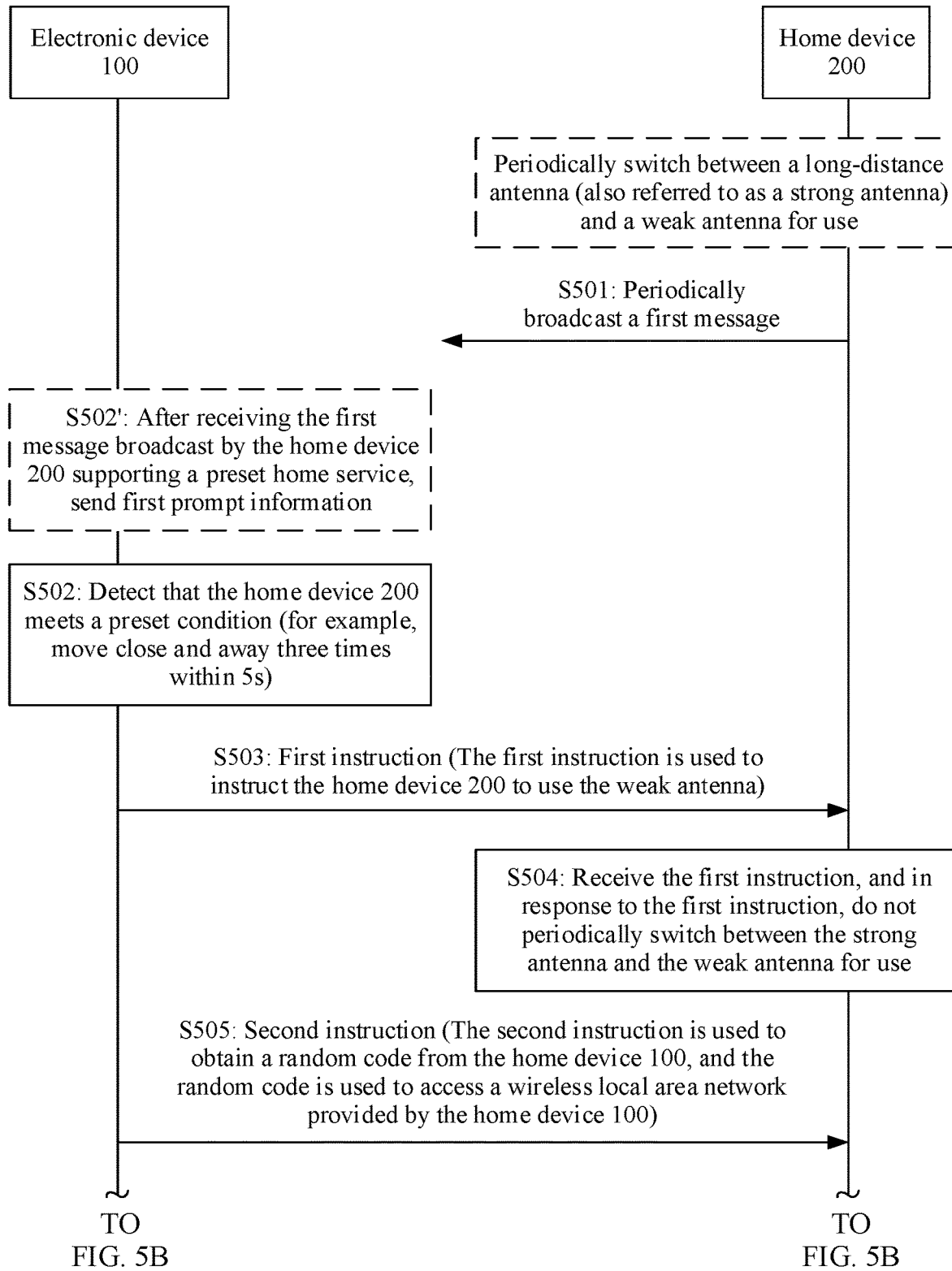
FIG. 5A and FIG. 5B are a flowchart of a home device control method according to an embodiment of this application.
Figure 5B:
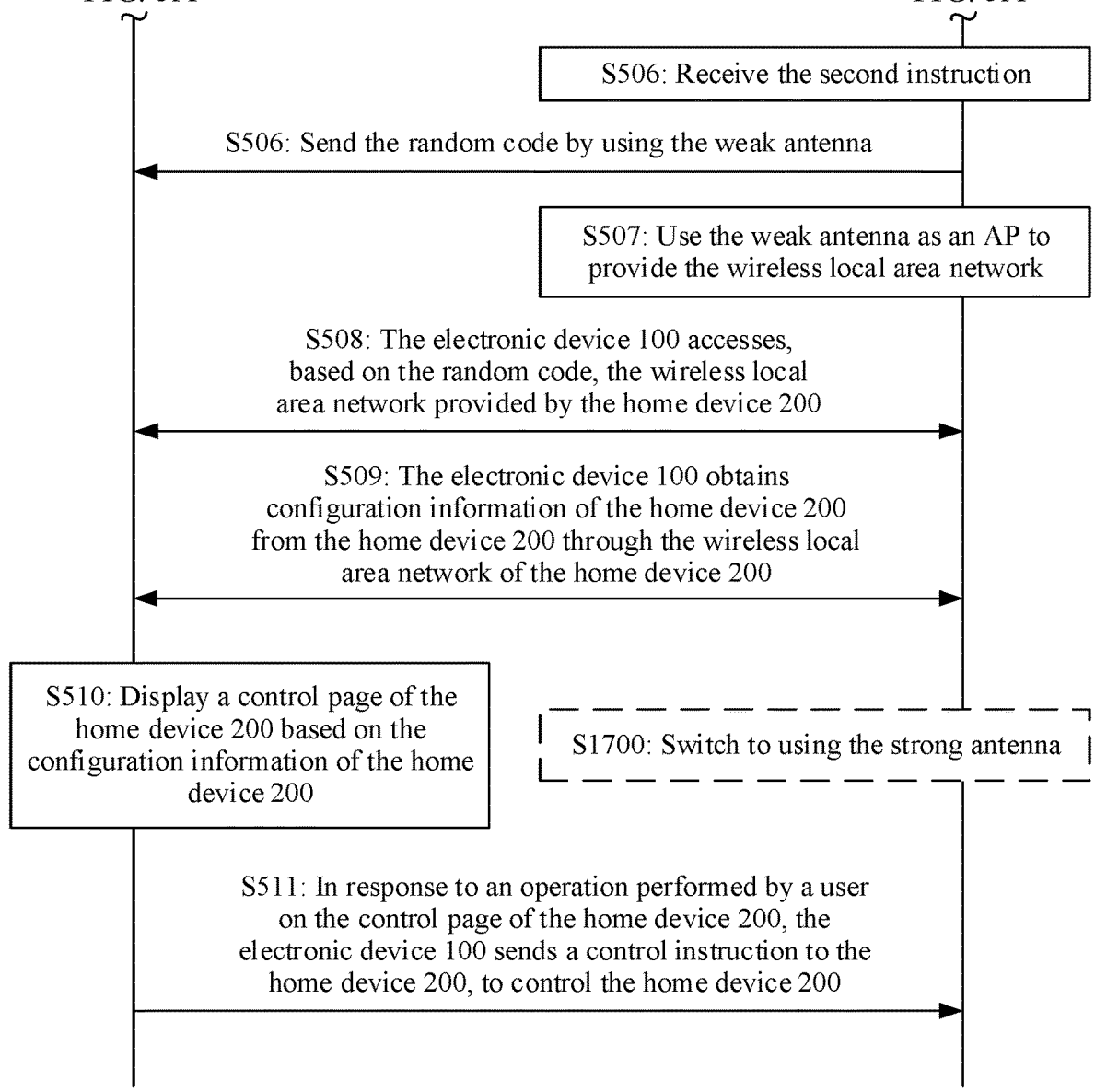

An embodiment of this application provides a home device control method. This may be used for interaction between the electronic device 100 and the home device 200 shown in FIG. 1, so that the electronic device 100 controls the home device 200. As shown in FIG. 5A and FIG. 5B, the method in this embodiment of this application may include S501 to S511.

S501: The home device 200 periodically broadcasts first messages.

For example, the first message is a Wi-Fi beacon (Beacon) frame broadcast by the home device 200 by using an ultra-short-haul antenna (also referred to as a weak antenna). Therefore, the first message may also be referred to as a short distance message or an ultra-short distance message.

The home device 200 may periodically switch between a long-distance antenna (also referred to as a strong antenna) and the weak antenna for use. When the home device 200 switches to using the weak antenna, the home device 200 may broadcast the first messages by using the weak antenna.

For example, periods in which the home device 200 switches between the long-distance antenna (also referred to as the strong antenna) and the weak antenna for use may be T1 and T2. For example, T1 may be any duration such as 2 seconds (s), 3 seconds, or 4 seconds, and T2 may be any duration such as 100 milliseconds (ms), 90 ms, or 80 ms. For example, T1=2 s and T2=100 ms. It is assumed that the home device 200 switches from the weak antenna to the strong antenna at a moment t0. At a moment t1, that is, after 2 s from the moment t0, the home device 200 may switch from the strong antenna to the weak antenna. Duration from the moment t0 to the moment t1 is 2 s. Then, at a moment t2, that is, after 100 ms from the moment t1, the home device 200 may switch from the weak antenna to the strong antenna. Duration from the moment t1 to the moment t2 is 100 ms. In this way, the home device 200 may periodically switch, based on the period T1 and the period T2, between the strong antenna and the weak antenna for use.

In this embodiment of this application, when the home device 200 switches to using the weak antenna, the home device 200 may broadcast one or more first messages in each period of T2. For example, T2=100 ms. The home device 200 may broadcast one first message every 20 ms within the 100 ms. In this way, the home device 200 may broadcast five first messages within the 100 ms.

The first message may include an SSID of a wireless local area network provided by the home device 200 as a wireless access point (access point, AP).

In some embodiments, the first message may further include an identifier of the home device 200. The identifier of the home device 200 may be used to uniquely identify the home device 200. For example, the device identifier of the home device 200 may be a media access control (media access control, MAC) address of the home device.

It should be noted that for a specific method in which the home device 200 broadcasts the first messages by using the weak antenna, refer to detailed descriptions of FIG. 4A or FIG. 4B in the foregoing embodiment. Details are not described herein again. An effective propagation distance of the first message broadcast by the home device 200 by using the weak antenna is a first distance. For example, the first distance may be 0.3 m, namely, 30 centimeters (cm).

It may be understood that, only when a distance between an electronic device and the home device 200 is less than the first distance, the electronic device can receive the first message (that is, the beacon frame) broadcast by the home device 200 by using the weak antenna. A shorter distance between the electronic device and the home device 200 indicates a higher signal strength of the first message detected by the home device; and a longer distance between the electronic device and the home device 200 indicates a lower signal strength of the first message detected by the home device.

It should be noted that regardless of whether the home device 200 is configured with a network (that is, whether the home device 200 accesses a wireless local area network provided by a router) and whether the home device 200 is registered with a home cloud, the home device 200 may perform S501 to periodically broadcast the first messages. In other words, the method in this embodiment of this application is applicable to a home device in any one of the following states, for example, a home device with a network configured, a home device without a network configured, a registered device, and an unregistered home device.

S502: The electronic device 100 detects that the home device 200 meets a preset condition.

In some embodiments, that the electronic device 100 detects that the home device 200 meets the preset condition may specifically include: The electronic device 100 receives, within first preset duration, N first messages broadcast by the home device 200. For example, the first preset duration may be any duration such as 3 s, 4 s, 5 s, or 6 s. The first preset duration is greater than T1. N≥1, and N is a positive integer.

In some other embodiments, that the electronic device 100 detects that the home device 200 meets the preset condition may include not only that the electronic device 100 receives, within the first preset duration, the N first messages broadcast by the home device 200, but also at least one of the following: the home device 200 supports a preset home service; and signal strength of the N first messages is greater than a first strength threshold.

A first APP installed in the electronic device 100 may provide the preset home service for a user, for example, a Huawei smart home service. In other words, that the home device 200 supports the preset home service specifically means that the home device 200 supports the preset home service provided by the first APP in the electronic device 100. The electronic device 100 may identify, by using the first identifier carried in the first message, that the home device 200 supports the preset home service. For example, the first identifier may be a product type (Product Type) of the home device 200, and the product type may be used to identify a manufacturer and/or a product model of the home device 200. For another example, the first identifier may be a preset identifier used to identify the home device that supports the preset home service.

In some other embodiments, as shown in FIG. 5A, before the electronic device 100 detects that the home device 200 meets the preset condition, the method in this embodiment of this application may further include S502'.

S502': After receiving the first message broadcast by the home device 200 that supports the preset home service, the electronic device 100 sends first prompt information.

The electronic device 100 may identify, by using the first identifier carried in the first message, that the home device 200 supports the preset home service. The first prompt information is used to indicate the user to control the electronic device 100 to move close to the home device 200 in a preset manner. For detailed descriptions of the foregoing preset manner, refer to the following Implementation (1) and Implementation (2).

Implementation (1): The preset manner may be that the electronic device 100 moves close to the home device 200 for at least second preset duration. The second preset duration is greater than or equal to the first preset duration. For example, the second preset duration may be any duration such as 4 s, 5 s, or 6 s.

Figure 6:
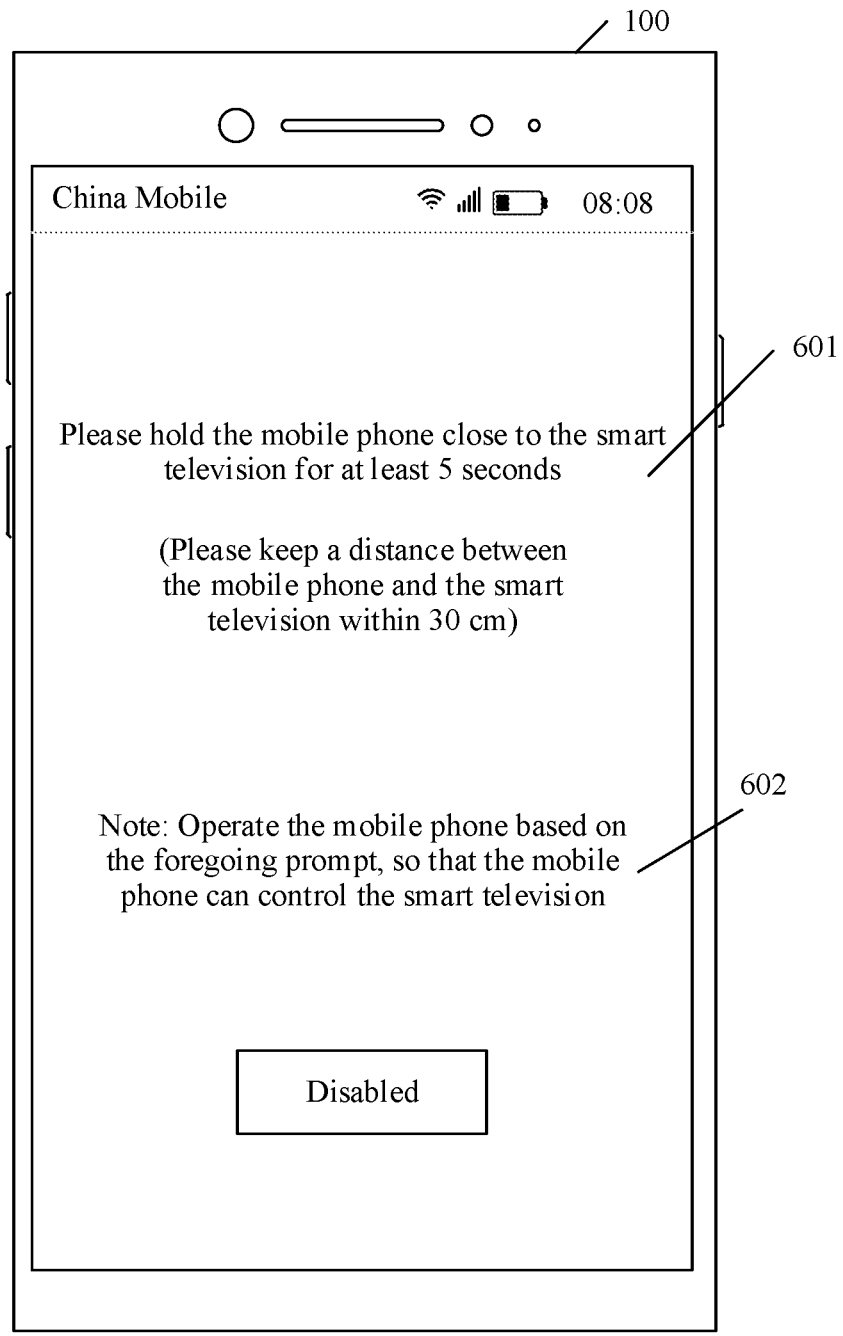
FIG. 6 is a schematic diagram of a display interface of an electronic device according to an embodiment of this application.

For example, the second preset duration is 5 s, and the home device 200 is a smart television. The electronic device 100 may display a prompt interface shown in FIG. 6. The prompt interface includes first prompt information 601, for example, "Please hold the mobile phone close to the smart television for at least 5 seconds". Alternatively, the electronic device 100 may send the first prompt information in a voice playing manner, for example, "Please move close to the smart television for at least 5 s".

Optionally, the first prompt information may further indicate a distance range within which the user controls the electronic device 100 to move close to the home device 200. For example, the first prompt information 601 shown in FIG. 6 may further include "Please keep a distance between the mobile phone and the smart television within 30 cm".

It may be understood that, after the electronic device 100 performs S502', if the user controls, based on an indication of the first prompt information, the electronic device 100 to move close to the home device 200, a possibility that the electronic device 100 receives the N first messages within the first preset duration is relatively high, and a possibility that the electronic device 100 detects that the home device 200 meets the preset condition is relatively high.

In Implementation (1), that the home device 200 meets a preset condition in S502 may specifically include: The electronic device 100 receives, within the first preset duration, the N first messages broadcast by the home device 200. Optionally, that the home device 200 meets the preset condition in S502 may further include at least one of the following: Signal strength of the N first messages is greater than a first strength threshold.

Implementation (2): The preset manner may be that the electronic device moves close to and then away from the home device 200 M times within second preset duration. The second preset duration is greater than or equal to the first preset duration. For example, the second preset duration may be any duration such as 4 s, 5 s, or 6 s. M≥2, and M is a positive integer.

Figure 7:
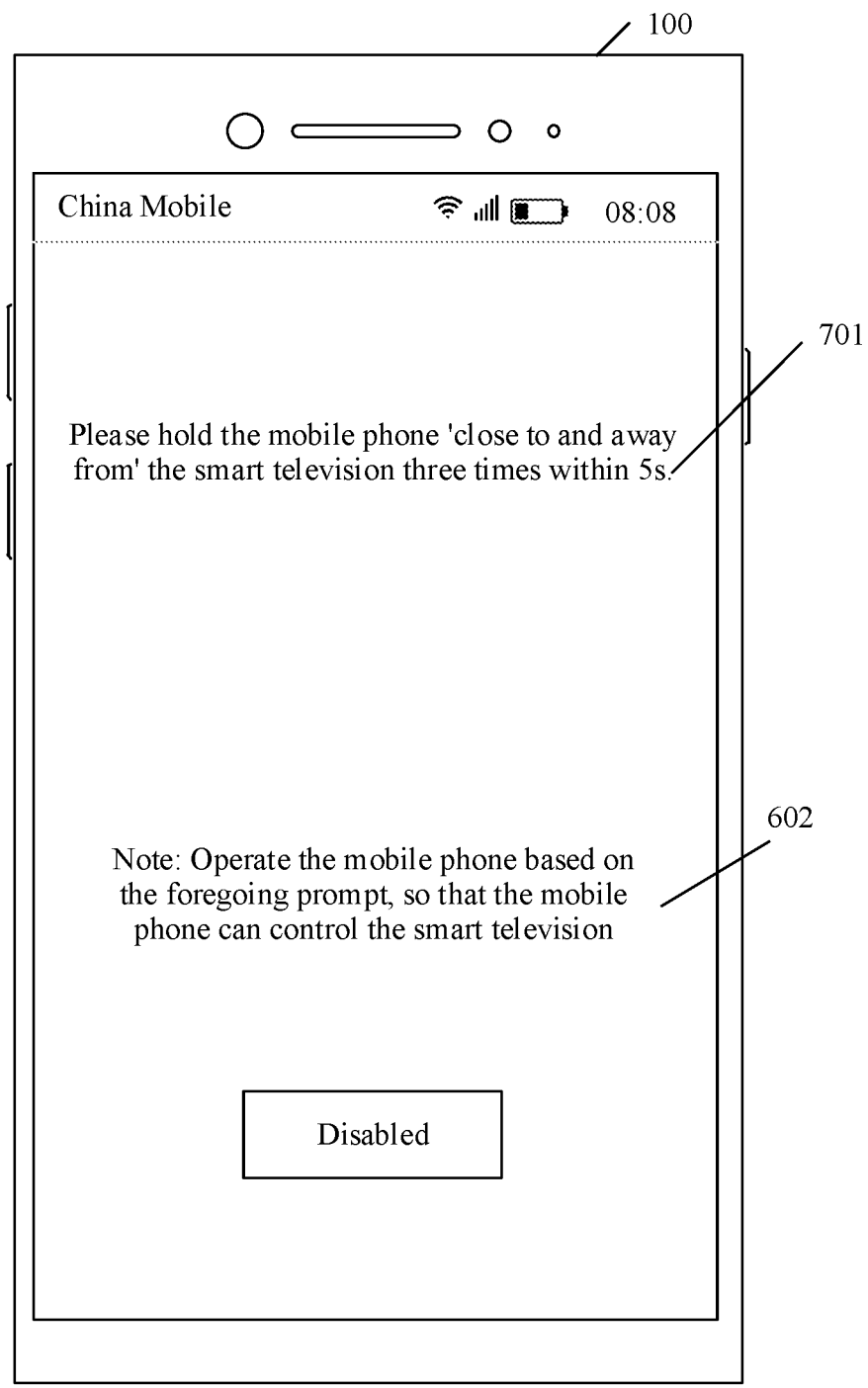
FIG. 7 is a schematic diagram of another display interface of an electronic device according to an embodiment of this application.

For example, the second preset duration is 5 s, the home device 200 is a smart television, and M=3. The electronic device 100 may display a prompt interface shown in FIG. 7. The prompt interface includes first prompt information 701, for example, "Please hold the mobile phone 'close to and away from' the smart television three times within 5 s!". Alternatively, the electronic device 100 may send the first prompt information in a voice playing manner, for example, "Please move close to and then away from the smart television three times within 5 s".

It may be understood that, after the electronic device 100 performs S502', if the user controls, based on an indication of the first prompt information, the electronic device 100 to move close to the home device 200, a possibility that the electronic device 100 receives the N first messages within the first preset duration is relatively high, and a possibility that the electronic device 100 detects that the home device 200 meets the preset condition is relatively high.

In Implementation (2), that the home device 200 meets the preset condition in S502 may specifically include: The electronic device 100 receives, within first preset duration, N first messages broadcast by the home device 200, and signal strength of the N first messages changes M times under a preset fluctuation condition.

That the signal strength of the N first messages changes once under the preset fluctuation condition may specifically include: Signal strength of one or more first messages received by the electronic device 100 is greater than a second strength threshold, and the signal strength of the one or more first messages received by the electronic device is less than a third strength threshold. The second strength threshold is greater than the third strength threshold.

When the electronic device 100 is very close to (for example, touches or comes into contact with) the home device 200, the second strength threshold may be signal strength of the first message that is broadcast by the home device 200 and that is received by the electronic device 100. When the electronic device 100 is away from the home device 200 (for example, the distance between the electronic device 100 and the home device 200 is the first distance), the third strength threshold may be signal strength of the first message that is broadcast by the home device 200 and that is received by the electronic device 100.

M=3 is used as an example. That the signal strength of the N first messages changes three times under the preset fluctuation condition may be specifically: The signal strength of the one or more first messages received by the electronic device 100 is greater than the second strength threshold, and the signal strength of the one or more first messages received by the electronic device is less than the third strength threshold; then the signal strength of the one or more first messages received by the electronic device 100 is greater than the second strength threshold, and the signal strength of the one or more first messages received by the electronic device is less than the third strength threshold; and then the signal strength of the one or more first messages received by the electronic device 100 is greater than the second strength threshold, and the signal strength of the one or more first messages received by the electronic device is less than the third strength threshold.

Figure 8:
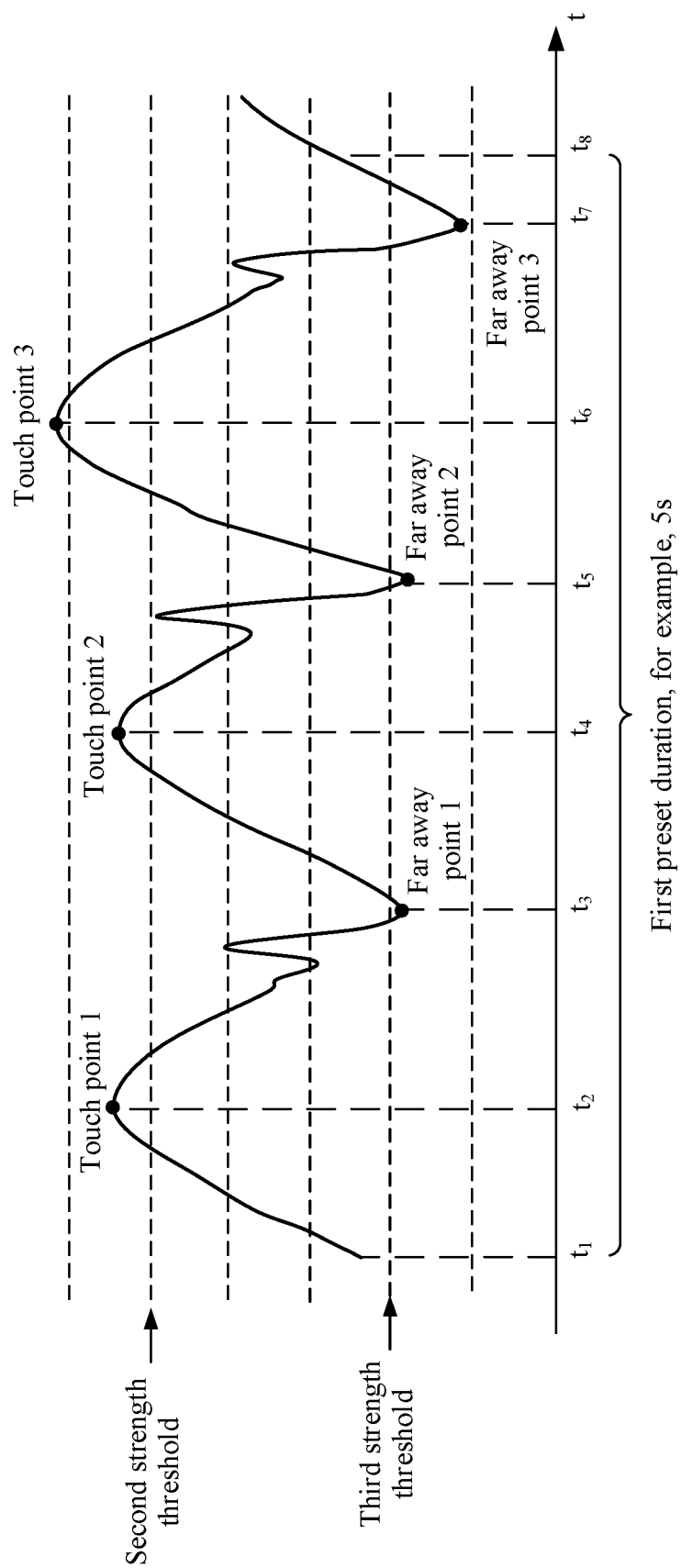
FIG. 8 is a schematic diagram of a signal strength change of a short distance message according to an embodiment of this application.

FIG. 8 is a schematic diagram illustrating signal strength changes of a plurality of first messages detected by the electronic device 100 in a process in which the electronic device 100 moves close to and then away from the home device 200 three times within 5 s.

For example, it is assumed that the electronic device 100 receives, at the moment $t_1$ shown in FIG. 8, the first message broadcast by the home device 200, and the electronic device 100 identifies that the home device 200 supports the preset home service. The electronic device 100 may send first prompt information, for example, "Please hold the mobile phone 'close to and away from the smart television' three times within 5 s!". If the user operates the electronic device 100 based on the indication of the first prompt information, the electronic device 100 may detect, in duration from the moment $t_1$ to a moment $t_8$ (that is, the first preset duration, for example, 5 s), a plurality of first messages whose signal strength changes in a waveform shown in FIG. 8.

With reference to FIG. 8, in this embodiment of this application, a change of the signal strength of the first message detected by the electronic device 100 in a process in which the user holds the electronic device 100 and operates the electronic device 100 based on the indication of the first prompt information in Implementation (2) is described.

Starting from the moment $t_1$ shown in FIG. 8, the user holds the electronic device 100 close to (or to touch or come into contact with) the home device 200 for the first time. At the moment $t_2$ shown in FIG. 8, the electronic device 100 touches or comes into contact with the home device 200 (referred to as a touch point 1). In other words, the electronic device 100 is very close to the home device 200. Therefore, signal strength of the first message that is broadcast by the home device 200 and that is received by the electronic device 100 is relatively high. For example, as shown in FIG. 8, at the touch point 1 of the moment $t_2$, the signal strength of the first message detected by the electronic device 100 is greater than the second strength threshold.

Starting from the moment $t_2$ shown in FIG. 8, the user holds the electronic device 100 away from the home device 200 for the first time. At a moment $t_3$ shown in FIG. 8, the electronic device 100 is relatively away from the home device 200 (referred to as a far away point 1). Therefore, signal strength of the first message that is broadcast by the home device 200 and that is received by the electronic device 100 is relatively low. For example, as shown in FIG. 8, at the far away point 1 of the moment $t_3$, the signal strength of the first message detected by the electronic device 100 is less than the third strength threshold.

In duration from the moment $t_1$ to the moment $t_3$, the electronic device 100 first moves close to the home device 200, so that the signal strength of the first message detected by the electronic device 100 is greater than the second strength threshold; and then the electronic device 100 moves away from the home device 200, so that the signal strength of the first message detected by the electronic device 100 is less than the third strength threshold. In this way, in the duration from the moment $t_1$ to the moment $t_3$, the electronic device 100 detects that the signal strength of the first message changes once under the preset fluctuation condition.

Starting from the moment $t_3$ shown in FIG. 8, the user holds the electronic device 100 close to (or to touch or come into contact with) the home device 200 for the second time. At a moment $t_4$ shown in FIG. 8, the electronic device 100 touches or comes into contact with the home device 200 (referred to as a touch point 2). In other words, the electronic device 100 is very close to the home device 200. Therefore, the signal strength of the first message that is broadcast by the home device 200 and that is received by the electronic device 100 is relatively high. For example, as shown in FIG. 8, at the touch point 2 of the moment $t_4$, the signal strength of the first message detected by the electronic device 100 is greater than the second strength threshold.

Starting from the moment $t_4$ shown in FIG. 8, the user holds the electronic device 100 away from the home device 200 for the second time. At a moment $t_5$ shown in FIG. 8, the electronic device 100 is relatively away from the home device 200 (referred to as a far away point 2). Therefore, the signal strength of the first message that is broadcast by the home device 200 and that is received by the electronic device 100 is relatively low. For example, as shown in FIG. 8, at the far away point 2 of the moment $t_5$, the signal strength of the first message detected by the electronic device 100 is less than the third strength threshold.

In duration from the moment $t_3$ to the moment $t_5$, the electronic device 100 first moves close to the home device 200, so that the signal strength of the first message detected by the electronic device 100 is greater than the second strength threshold; and then the electronic device 100 moves away from the home device 200, so that the signal strength of the first message detected by the electronic device 100 is less than the third strength threshold. In conclusion, in duration from the moment $t_1$ to the moment $t_5$, the electronic device 100 detects that the signal strength of the first message changes twice under the preset fluctuation condition.

Starting from the moment $t_5$ shown in FIG. 8, the user holds the electronic device 100 close to (or to touch or come into contact with) the home device 200 for a third time. At a moment $t_6$ shown in FIG. 8, the electronic device 100 touches or comes into contact with the home device 200 (referred to as a touch point 3). In other words, the electronic device 100 is very close to the home device 200. Therefore, the signal strength of the first message that is broadcast by the home device 200 and that is received by the electronic device 100 is relatively high. For example, as shown in FIG. 8, at the touch point 3 of the moment $t_6$, the signal strength of the first message detected by the electronic device 100 is greater than the second strength threshold.

Starting from the moment $t_6$ shown in FIG. 8, the user holds the electronic device 100 away from the home device 200 for a third time. At a moment $t_7$ shown in FIG. 8, the electronic device 100 is relatively away from the home device 200 (referred to as a far away point 3). Therefore, the signal strength of the first message that is broadcast by the home device 200 and that is received by the electronic device 100 is relatively low. For example, as shown in FIG. 8, at the far away point 3 of the moment $t_7$, the signal strength of the first message detected by the electronic device 100 is less than the third strength threshold.

In duration from the moment $t_5$ to the moment $t_7$, the electronic device 100 first moves close to the home device 200, so that the signal strength of the first message detected by the electronic device 100 is greater than the second strength threshold; and then the electronic device 100 moves away from the home device 200, so that the signal strength of the first message detected by the electronic device 100 is less than the third strength threshold. In conclusion, in the duration from the moment $t_5$ to the moment $t_7$, the electronic device 100 detects that the signal strength of the first message changes three times under the preset fluctuation condition.

In some other embodiments, after receiving the first message broadcast by the home device 200 that supports the preset home service, the electronic device 100 may send not only the first prompt information, but also second prompt information. The second prompt information is used to indicate the user to control the home device 200 by using the electronic device 100 after operating the electronic device 100 based on a prompt of the first prompt information. For example, the mobile phone 100 may display second prompt information 602 shown in FIG. 6 or FIG. 7, for example, "Operate the mobile phone based on the foregoing prompt, so that the mobile phone can control the smart television!".

The second prompt information may be used to describe, to the user, an objective of indicating, by the electronic device 100, the user to operate the electronic device 100 based on the prompt of the first prompt information. In this way, after learning a function or an effect that can be implemented by operating the electronic device 100 based on the foregoing prompt, the user can determine whether to operate the electronic device 100 based on the foregoing prompt, to improve user experience in an operation process of the user.

Figure 9:
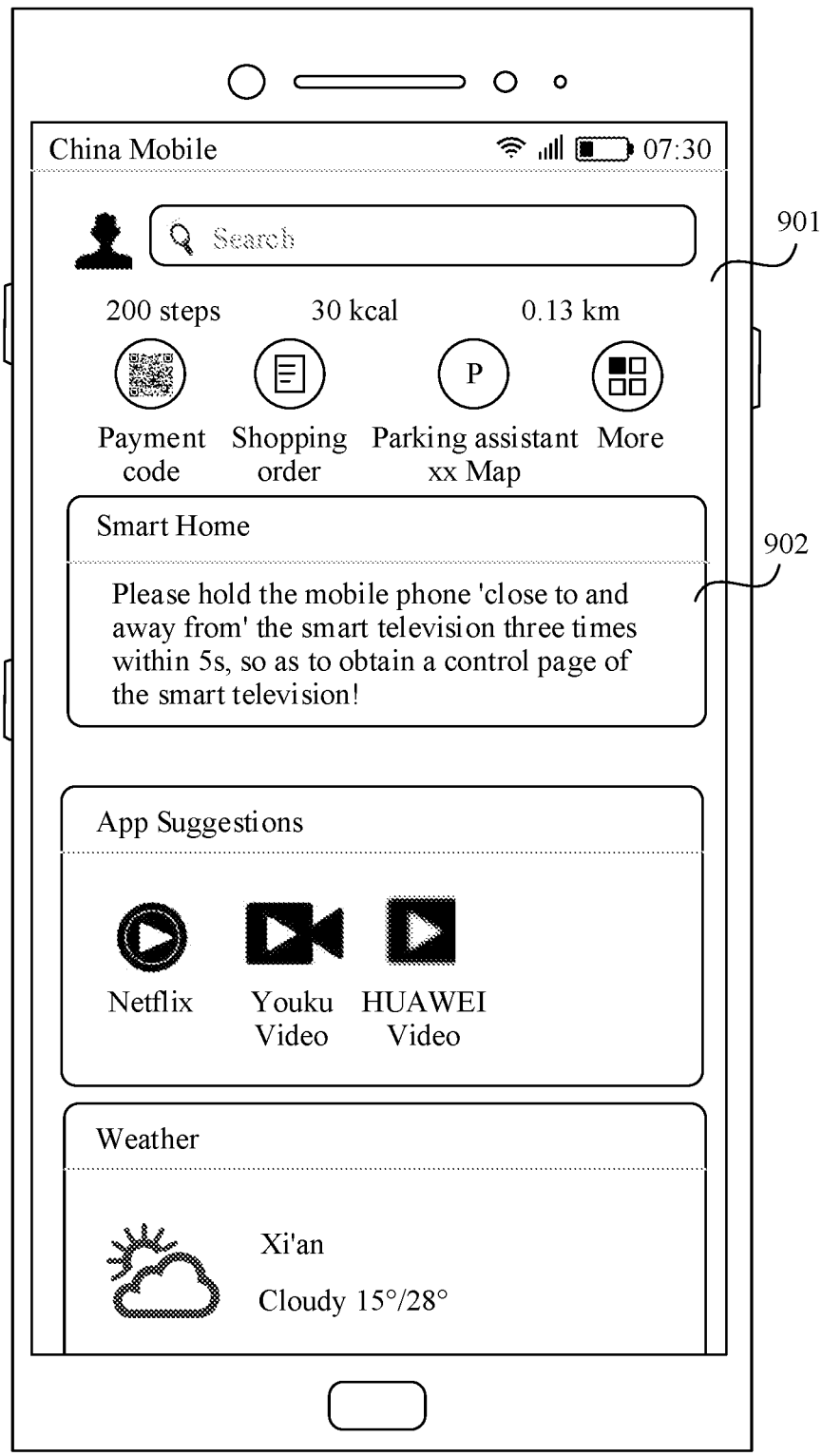
FIG. 9 is a schematic diagram of a display interface of an electronic device according to an embodiment of this application.
Figure 10:
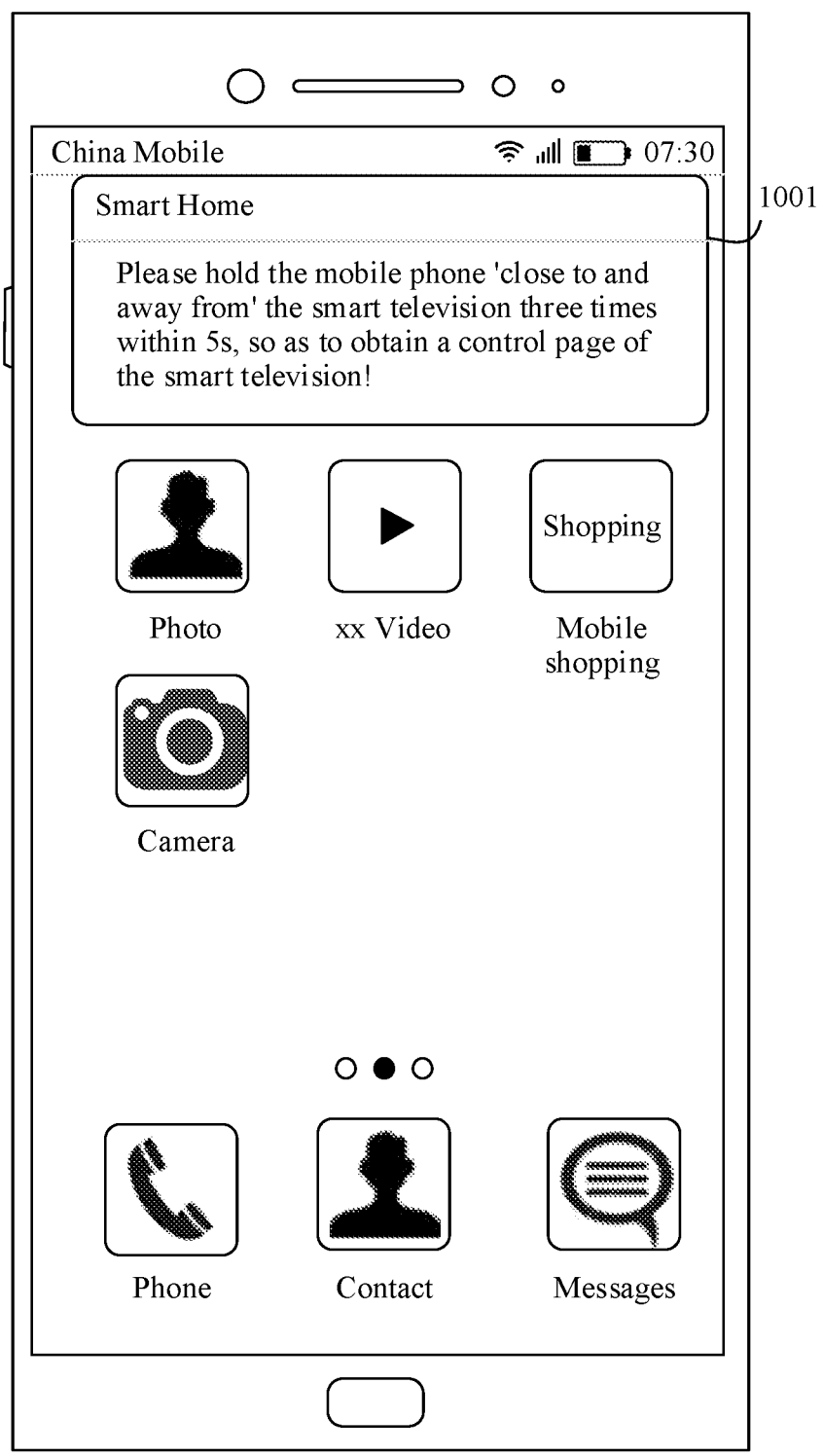
FIG. 10 is a schematic diagram of another display interface of an electronic device according to an embodiment of this application.

In some other embodiments, the electronic device 100 may further send the first prompt information and the second prompt information by using a leftmost screen or a notification message. For example, the electronic device 100 may display prompt information 902 on the leftmost screen 901 shown in FIG. 9, for example, "Please hold the mobile phone 'close to and away from' the smart television three times within 5 s, so as to obtain a control page of the smart television!". To enable the first prompt information sent by the electronic device 100 by using the leftmost screen to be discovered by the user in a timely manner, when sending the first prompt information, the electronic device 100 may further send a vibration prompt, a voice prompt, or the like. For another example, as shown in FIG. 10, the electronic device 100 may send prompt information by using a notification message 1001, for example, "Please hold the mobile phone 'close to and away from' the smart television three times within 5 s, so as to obtain a control page of the smart television!"

Optionally, the electronic device 100 or the user may set display duration for the first prompt information. For example, the mobile phone may always display the first prompt information within third preset duration starting from a time point at which the electronic device 100 displays the first prompt information. After displaying for the third preset duration, the electronic device 100 may automatically clear the first prompt information.

It should be noted that in this embodiment of this application, a method in which the electronic device 100 detects that the home device 200 meets the preset condition includes but is not limited to the foregoing method. An objective of detecting, by the electronic device 100, that the home device 200 meets the preset condition is to determine whether a user holding the electronic device 100 is willing to control the home device 200 by using the electronic device 100. If the user is willing to control the home device 200 by using the electronic device 100, the user operates the electronic device 100 based on the indication of the first prompt information. In this case, the electronic device 100 may detect that the home device 200 meets the preset condition.

If the electronic device 100 detects that the home device 200 meets the preset condition, it indicates that the user is willing to control the home device 200 by using the electronic device 100. In this case, the electronic device 100 may interact with the home device 200, to control the home device 200.

Specifically, if the electronic device 100 detects that the home device 200 meets the preset condition, the electronic device 100 may send the second message to the home device 200. The second message is used to indicate the home device 200 to use the ultra-short-haul antenna and is used to indicate to obtain a random code from the home device 200. The random code is used to access a wireless local area network provided by the home device 200.

For example, the second message may include a first instruction (also referred to as a touch instruction) and a second instruction (also referred to as a copy instruction). The first instruction is used to instruct the home device 200 to use the ultra-short-haul antenna (that is, the weak antenna). The second instruction is used to obtain the random code from the home device 200. Specifically, if the electronic device 100 detects that the home device 200 meets the preset condition, the electronic device 100 may perform S503.

S503: The electronic device 100 sends the first instruction to the home device 200. The first instruction is used to instruct the home device 200 to use an ultra-weak antenna.

The electronic device 100 may broadcast the first instruction. The electronic device 100 may broadcast the first instruction by using the long-distance antenna (that is, the strong antenna) or the ultra-short-haul antenna (that is, the weak antenna). This is not limited in this embodiment of this application. For example, the first instruction may be a Wi-Fi Beacon frame broadcast by the electronic device 100.

The first instruction includes the identifier of the home device 200. Therefore, after receiving the first instruction, the home device 200 may perform a corresponding operation in response to the first instruction; and after receiving the first instruction, another device may not respond to the first instruction or delete the first instruction.

The first instruction may include indication information used to indicate the home device 200 to use the weak antenna. For example, the indication information may be a preset flag bit in the first instruction. A specific manner in which the electronic device instructs, by using the first instruction, the home device 200 to use the ultra-short-haul antenna is not limited in this embodiment of this application.

S504: The home device 200 receives the first instruction, uses the ultra-short-haul antenna in response to the first instruction, and does not periodically switch between the strong antenna and the weak antenna for use.

It can be learned from the foregoing embodiment that the home device 200 may periodically switch between the strong antenna and the weak antenna for use. In this embodiment of this application, after receiving the first instruction, the home device 200 may not periodically switch between the strong antenna and the weak antenna for use, but always use the weak antenna until the home device 200 receives indication information or an instruction for switching between the strong antenna and the weak antenna for use.

S505: The electronic device 100 sends the second instruction to the home device 200. The second instruction is used to obtain the random code from the home device 200. The random code is used to access the wireless local area network provided by the home device 200.

The second instruction is further used to instruct the home device 200 to provide the wireless local area network as an AP. The second instruction includes the identifier of the home device 200. Therefore, after receiving the second instruction, the home device 200 may perform a corresponding operation in response to the second instruction; and after receiving the second instruction, another device may not respond to the second instruction or delete the second instruction.

S506: The home device 200 receives the second instruction, and sends the random code to the electronic device 100 by using the weak antenna.

The random code may be randomly generated by the home device 200. The random code is used to access the wireless local area network provided by the home device 200. For a specific implementation of the random code, refer to detailed descriptions in S508. Details are not described in this embodiment of this application again.

It should be noted that the home device 200 can send the random code to the electronic device 100 only after receiving the second instruction from the electronic device 100. The electronic device 100 sends the first instruction and the second instruction to the home device 200 only after detecting that the home device 200 meets the preset condition (for example, the electronic device 100 receives, within the first preset duration, the N first messages broadcast by the home device 200, and the signal strength of the N first messages changes M times under the preset fluctuation condition). In other words, the home device 200 may send the random code only to a device that detects that the home device 200 meets the preset condition. In this way, only the device (such as the electronic device 100) that detects that the home device 200 meets the preset condition can receive the random code, and only the electronic device 100 can access, based on the SSID and the random code, the wireless local area network provided by the home device 200. In this way, another device can be prevented from accessing, by mistake, the wireless local area network provided by the home device 200.

It should be understood that, after S504, the home device 200 uses the ultra-short-haul antenna. Therefore, in S506, the home device 200 sends the random code to the electronic device 100 by using the ultra-short-haul antenna.

An effective transmission distance for the home device 200 to perform wireless communication by using the weak antenna is the first distance. For example, the first distance is 30 cm. When the home device 200 uses the weak antenna, if the distance between the home device 200 and the electronic device 100 is less than the first distance, the home device 200 may communicate with the electronic device 100.

It may be understood that the effective transmission distance for wireless communication performed by the home device 200 by using the weak antenna is the first distance (for example, 0.3 m). Only when a distance between another device (for example, the home device 200) and the home device 200 is less than the first distance, the another device can receive the random code sent by the home device 200. A device whose distance from the home device 200 is greater than the first distance cannot receive the random code sent by the home device 200. After receiving the random code, the another device may access, by using the SSID and the random code, the wireless local area network provided by the home device 200.

In this embodiment of this application, ultra-short-haul communication is used, and the home device 200 sends the random code to the electronic device 100 by using the weak antenna, to ensure that the random code sent by the home device 200 is not received by another device, and ensure security of data transmission between the electronic device 100 and the home device 200. Further, another device can be prevented from accessing, by using the random code, the wireless local area network provided by the home device 200, to protect information security of the user.

S507: The home device 200 provides the wireless local area network by using the weak antenna as an AP.

It should be noted that, after S504, the home device 200 uses the ultra-short-haul antenna. Therefore, in S507, the home device 200 provides the wireless local area network by using the ultra-short-haul antenna as the AP.

S508: The electronic device 100 accesses, based on the random code, the wireless local area network provided by the home device 200.

It can be learned from the foregoing embodiment that the first message in S501 includes the SSID of the wireless local area network provided by the home device 200 used as the AP. In other words, the electronic device 100 has obtained the SSID of the home device 200. The random code in S505 is used to access the wireless local area network provided by the home device 200. Therefore, after receiving the random code, the electronic device 100 may access, based on the SSID and the random code, the wireless local area network provided by the home device 200.

In some embodiments, the wireless local area network provided by the home device 200 may be an encrypted wireless local area network. That is, not only the SSID but also an access password is required for accessing the wireless local area network.

In a case of this embodiment, the random code may be an access password of the wireless local area network provided by the home device 200 used as the AP. The home device 200 may send the access password only to the device that detects that the home device 200 meets the preset condition. In this way, only the device (such as the electronic device 100) that detects that the home device 200 meets the preset condition can receive the access password, and only the electronic device 100 can access, based on the SSID and the access password, the wireless local area network provided by the home device 200.

In another case of this embodiment, the first message in S501 may not only include the SSID of the wireless local area network provided by the home device 200, but also include the access password of the wireless local area network. The random code is an identity authentication code used to verify a device that requests to access the wireless local area network. Specifically, the random code may be used to verify whether the device that requests to access the wireless local area network is the device that detects that the home device 200 meets the preset condition.

Specifically, the home device 200 may store the random code in S506. After receiving an access request of another device (for example, the electronic device 100), the home device 200 not only determines whether an access password in the access request is correct, but also determines whether the access request carries a random code the same as the random code stored in the home device 200. If the access password in the access request is correct, and carries the random code the same as the random code stored in the home device 200, the electronic device 100 may access the wireless local area network provided by the home device 200.

In this case, the home device 200 sends the random code only to the electronic device 100 that detects that the home device 200 meets the preset condition. Therefore, even if another device can obtain the SSID and the access password of the wireless local area network provided by the home device 200, the another device cannot successfully access the wireless local area network provided by the home device 200 provided that the another device does not obtain the random code or the random code is incorrect.

In some other embodiments, the wireless local area network provided by the home device 200 may be an unencrypted wireless local area network. That is, no access password is required for accessing the wireless local area network.

In this embodiment, the random code is the identity authentication code used to verify a device that requests to access the wireless local area network. Specifically, the random code may be used to verify whether the device that requests to access the wireless local area network is the device that detects that the home device 200 meets the preset condition.

Specifically, the home device 200 may store the random code in S506. After receiving an access request of another device (for example, the electronic device 100), the home device 200 may determine whether the access request carries a random code the same as the random code stored in the home device 200. If the access request carries the random code the same as the random code stored in the home device 200, the electronic device 100 may access the wireless local area network provided by the home device 200.

In this case, the home device 200 sends the random code only to the electronic device 100 that detects that the home device 200 meets the preset condition. Therefore, even if another device can obtain the SSID of the wireless local area network provided by the home device 200, the another device cannot successfully access the wireless local area network provided by the home device 200 provided that the another device does not obtain the random code or the random code is incorrect.

In some other embodiments, a validity period of the random code is fourth preset duration starting from a time point at which the home device 200 generates the random code. For example, the fourth preset duration may be any duration such as 5 minutes, 10 minutes, or 15 minutes. The fourth preset duration may be set by the user in the home device 200, or the fourth preset duration may be preconfigured in the home device 400.

The home device 200 may verify validity of the random code in the access request sent by the electronic device 100, that is, determine whether the random code in the access request is within the validity period. If the random code in the access request is within the validity period, the electronic device 100 may be allowed to access the wireless local area network provided by the home device 200; or if the random code in the access request is not within the validity period, the electronic device 100 may be prohibited from accessing the wireless local area network provided by the home device 200.

For example, after generating the random code (for example, a random code 1), the home device 200 may store the random code 1. The home device 200 may delete the random code 1 from a time point at which the home device 200 generates or stores the random code 1 to an end of the fourth preset duration. In this way, if the electronic device 100 requests, within the fourth preset duration, to access the wireless local area network provided by the home device 200, the access may succeed. However, if the electronic device 100 requests, after the fourth preset duration, to access the wireless local area network provided by the home device 200, the access fails because the home device 200 does not store the random code in the access request.

S509: The electronic device 100 obtains configuration information of the home device 200 from the home device 200 through the wireless local area network of the home device 200.

The configuration information (Profile) of the home device 200 may include a device name of the home device 200, a device icon of the home device 200, icons used to implement various functions of the home device 200, and the like. For example, it is assumed that the home device 200 is a smart television, and configuration information of the smart television may include a device name (for example, a smart television of the xx brand) of the smart television, a device icon of the smart television, an on/off icon, a volume adjustment icon, and a channel adjustment icon that are of the smart television, and the like. For another example, it is assumed that the home device 200 is an air conditioner, and configuration information of the air conditioner may include a device name (for example, an air conditioner of the xx brand) of the air conditioner, a device icon of the air conditioner, an on/off icon and a temperature adjustment icon that are of the smart air conditioner, and the like.

The configuration information of the home device 200 is used to generate a control page of the home device 200. For example, the electronic device 100 may generate, based on the configuration information of the home device 200, the control page including the device name of the home device 200 and the various icons of the home device 200. The control page may be used by the user to control the home device 200.

In some embodiments, the electronic device 100 may request the configuration information of the home device 200 from the home device 200. Specifically, S509 may include: The electronic device 100 sends a first request to the home device 200 through the wireless local area network of the home device 200, and the first request is used to request to obtain the configuration information of the home device 200; and the home device 200 receives the first request, and sends a first response to the electronic device, and the first response includes the configuration information of the home device 200.

In some other embodiments, the home device 200 may actively send the configuration information of the home device 200 to the electronic device 100. Specifically, S509 may include: The home device 200 sends the configuration information of the home device 200 to the electronic device 100 through the wireless local area network of the home device 200.

It should be noted that, after S504, the home device 200 uses the ultra-short-haul antenna. Therefore, in S509, the home device 200 interacts with the electronic device 100 by using the ultra-short-haul antenna, to transmit the configuration information of the home device 200.

In this embodiment of this application, the ultra-short-haul communication is used, and the home device 200 sends the configuration information of the home device 200 to the electronic device 100 by using the weak antenna, to ensure that the configuration information of the home device 200 sent by the home device 200 is not received by another device, and ensure the security of data transmission between the electronic device 100 and the home device 200.

In some other embodiments, to further improve the security of data transmission between the electronic device 100 and the home device 200, the electronic device 100 and the home device 200 may negotiate an encryption key, and encrypt transmitted data (for example, the configuration information of the home device 200) by using the encryption key. In this way, the security of data transmission between the electronic device 100 and the home device 200 can be further improved.

S510: The electronic device 100 displays the control page of the home device 200 based on the configuration information of the home device 200.

It may be understood that the configuration information of the home device includes the various icons of the home device 200. The electronic device 100 may generate and display the control page of the home device 200 based on the configuration information of the home device 200. All interface elements (such as a chart or a button) on the control page of the home device 200 are generated based on the configuration information of the home device 200. For a specific method in which the electronic device 100 may generate the control page of the home device 200 based on the configuration information of the home device 200, refer to detailed descriptions in a conventional technology. Details are not described herein.

For example, the home device 200 is a smart desk lamp. The electronic device 100 (for example, a mobile phone) may display a control page 1101 of the smart desk lamp shown in FIG. 11. The control page 1101 may include an icon of the smart desk lamp, an on/off button of the smart desk lamp, a brightness adjustment option of the smart desk lamp, a mode option (such as an eye comfort mode option and a sleep mode option) of the smart desk lamp, an alarm clock setting option of the smart desk lamp, and the like.

Figure 12:
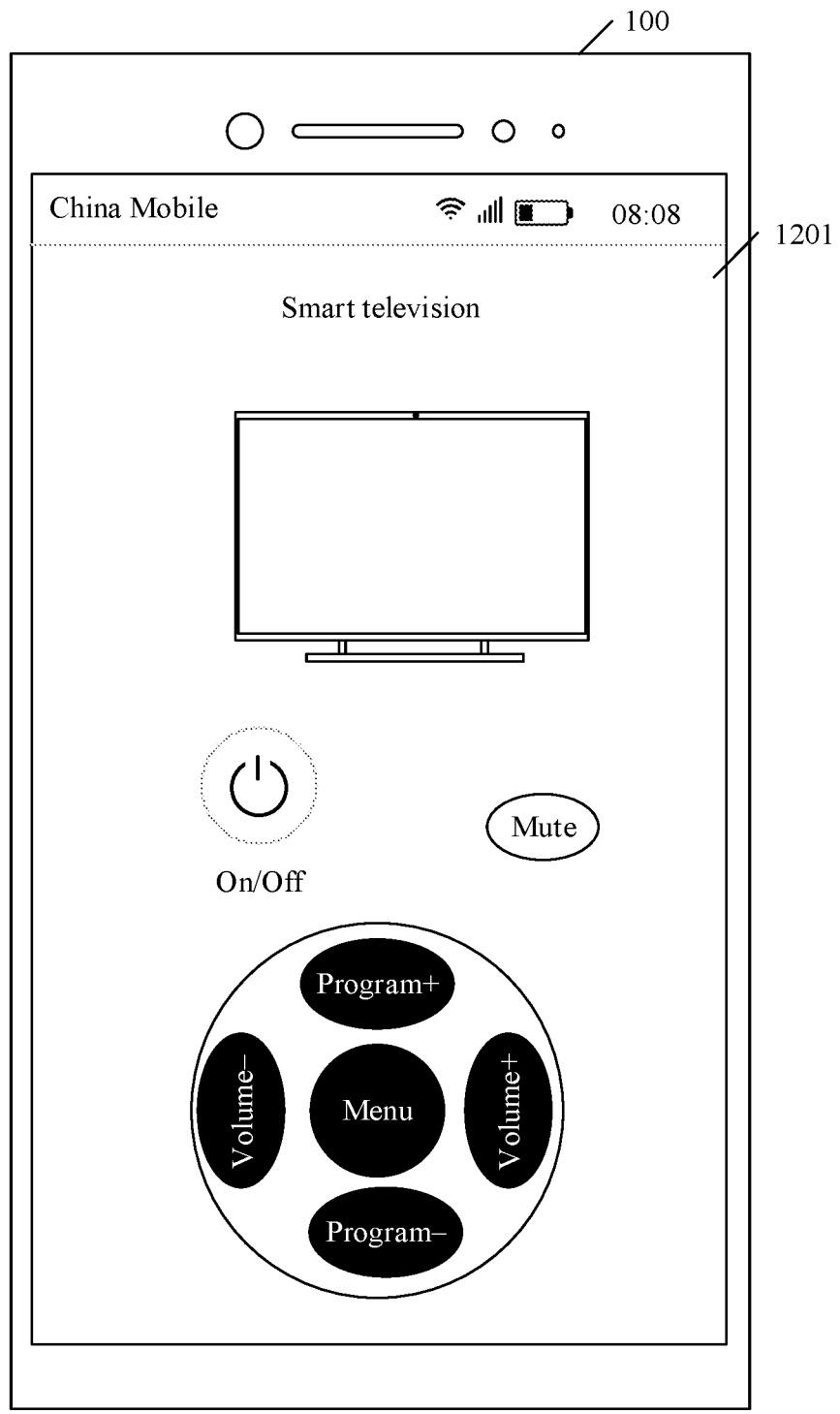
FIG. 12 is a schematic diagram of another display interface of an electronic device according to an embodiment of this application.

For another example, the home device 200 is a smart television. The electronic device 100 (for example, a mobile phone) may display a control page 1201 of the smart television shown in FIG. 12. The control page 1201 may include an icon of the smart television, an on/off button, a mute button, and a menu option that are of the smart television, and the like.

In some embodiments, the electronic device 100 may display the control page of the home device 200 by using a leftmost screen or a notification message.

Figure 13:
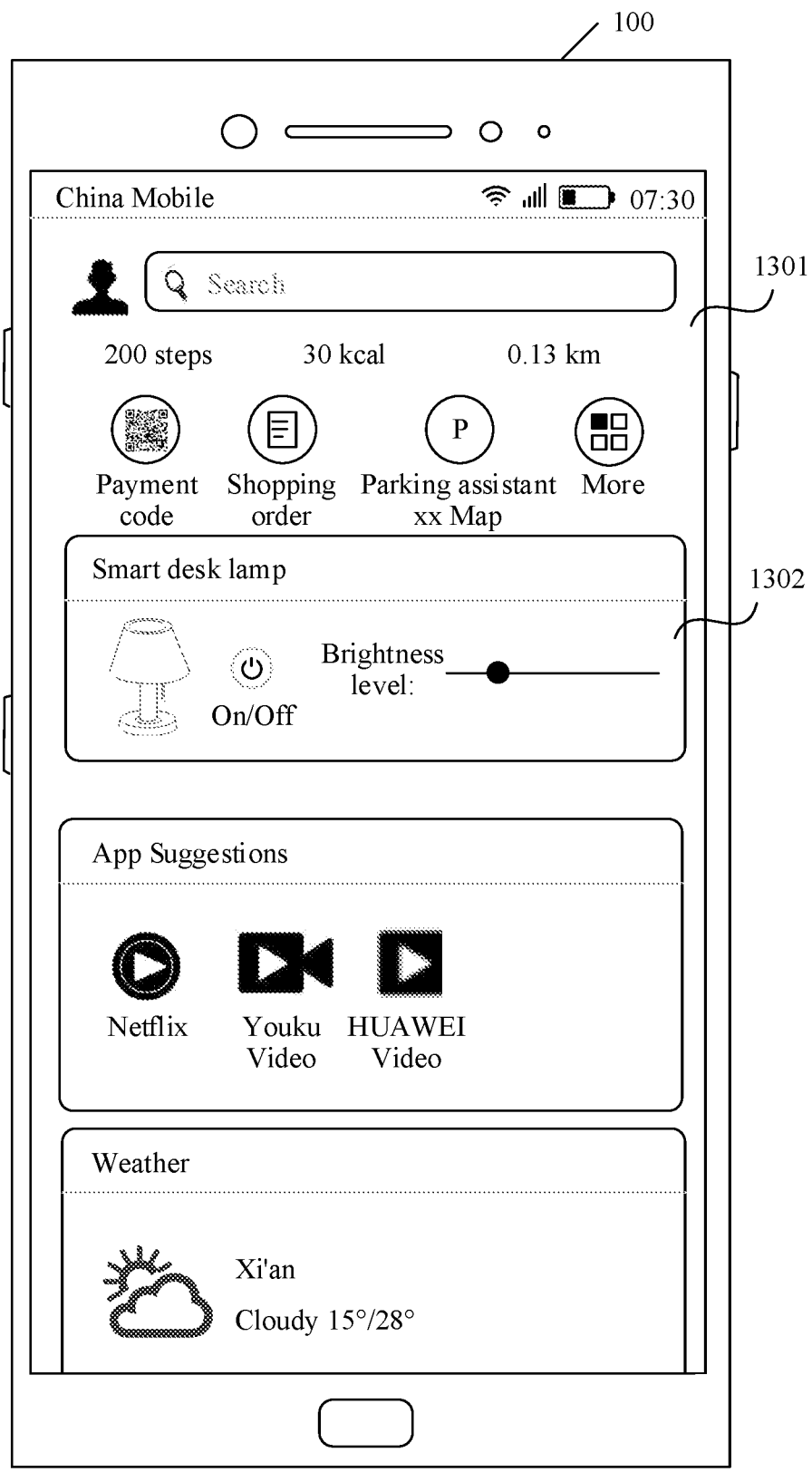
FIG. 13 is a schematic diagram of another display interface of an electronic device according to an embodiment of this application.

For example, as shown in FIG. 13, the electronic device 100 (for example, a mobile phone) may display a control page 1302 of the smart desk lamp on a leftmost screen 1301. The control page 1302 may include the icon of the smart desk lamp, the on/off button of the smart desk lamp, and the brightness adjustment option of the smart desk lamp.

Figure 14:
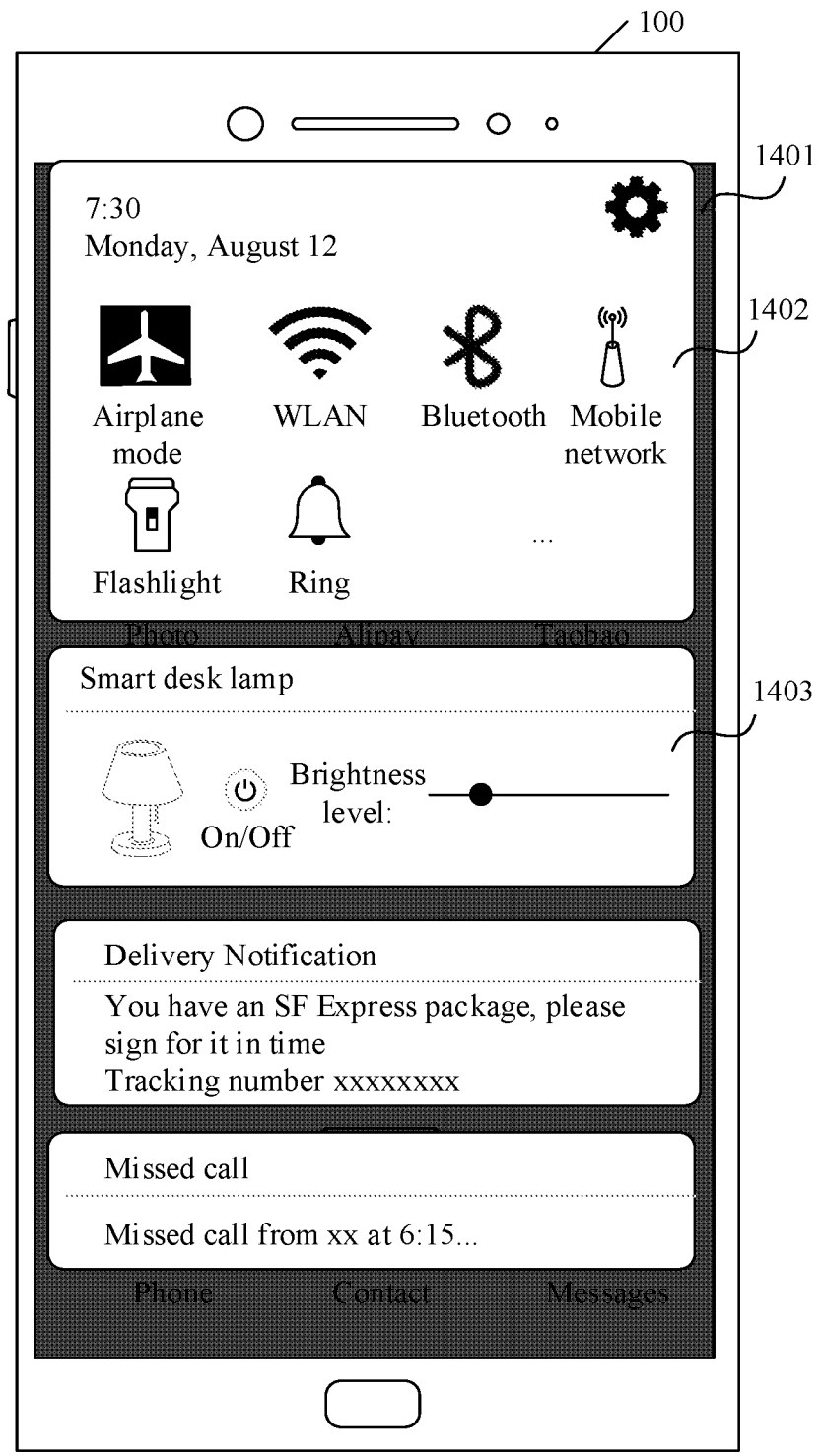
FIG. 14 is a schematic diagram of another display interface of an electronic device according to an embodiment of this application.

For another example, as shown in FIG. 14, the electronic device 100 (for example, a mobile phone) may display a control page 1403 of the smart desk lamp in the notification message on a notification interface 1401. The control page 1403 may include the icon of the smart desk lamp, the on/off button of the smart desk lamp, and the brightness adjustment option of the smart desk lamp. The notification interface 1401 shown in FIG. 14 further includes a notification bar 1402.

Figure 11:
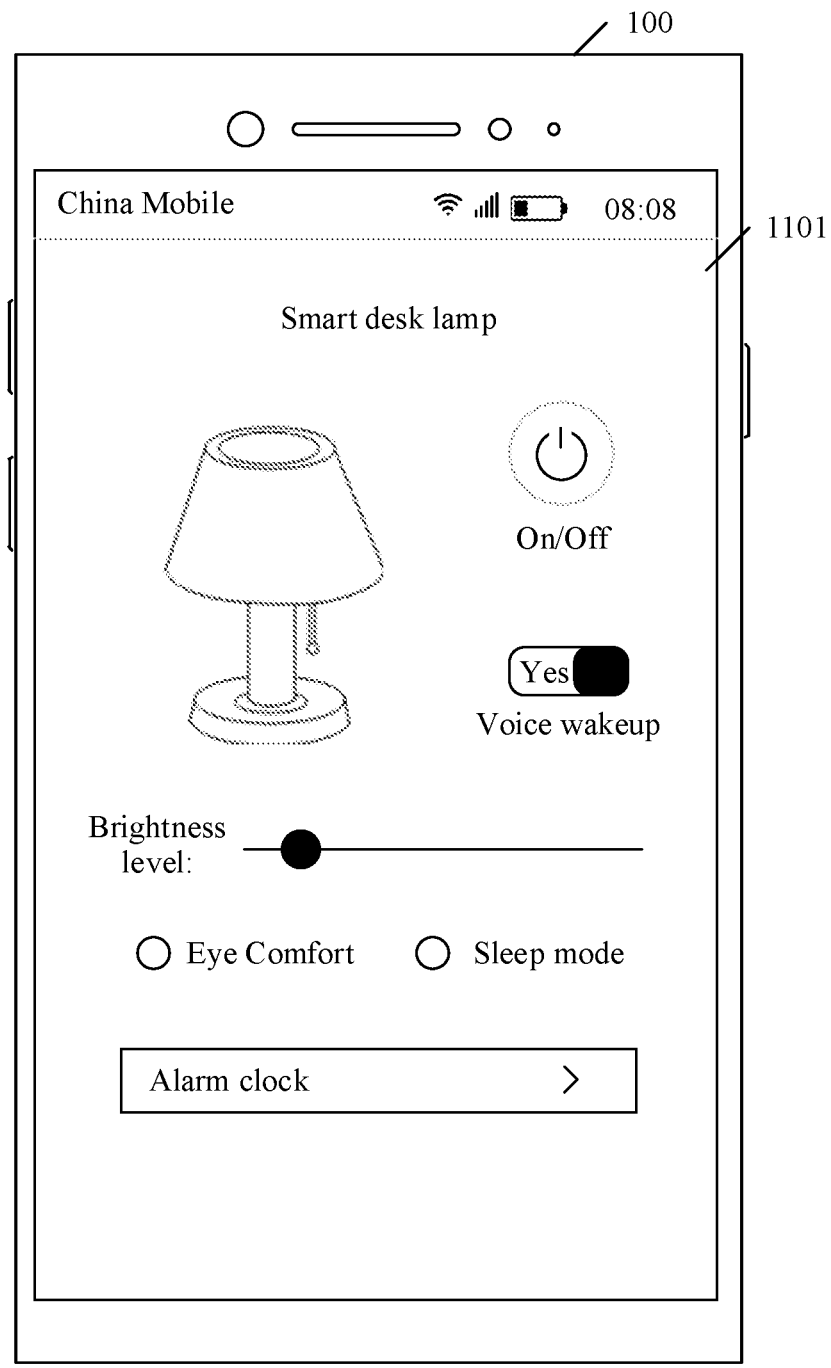
FIG. 11 is a schematic diagram of another display interface of an electronic device according to an embodiment of this application.

It may be understood that, because a display area of displaying the control page of the smart desk lamp on the leftmost screen or the notification message is limited, compared with the control page 1101 shown in FIG. 11, the control page 1302 shown in FIG. 13 and the control page 1403 shown in FIG. 14 have fewer interface elements. In some other embodiments, to enable the electronic device 100 to control the home device 200 more comprehensively, the electronic device 100 is used by the user to perform a preset operation (for example, any operation such as a tap operation, a double-tap operation, or a touch and hold operation) on the control page 1302 in the leftmost screen 1301 shown in FIG. 13 or the control page 1403 in the notification interface 1401 shown in FIG. 14, and the electronic device 100 may display the control page 1101 of the smart desk lamp shown in FIG. 11.

Figure 15:
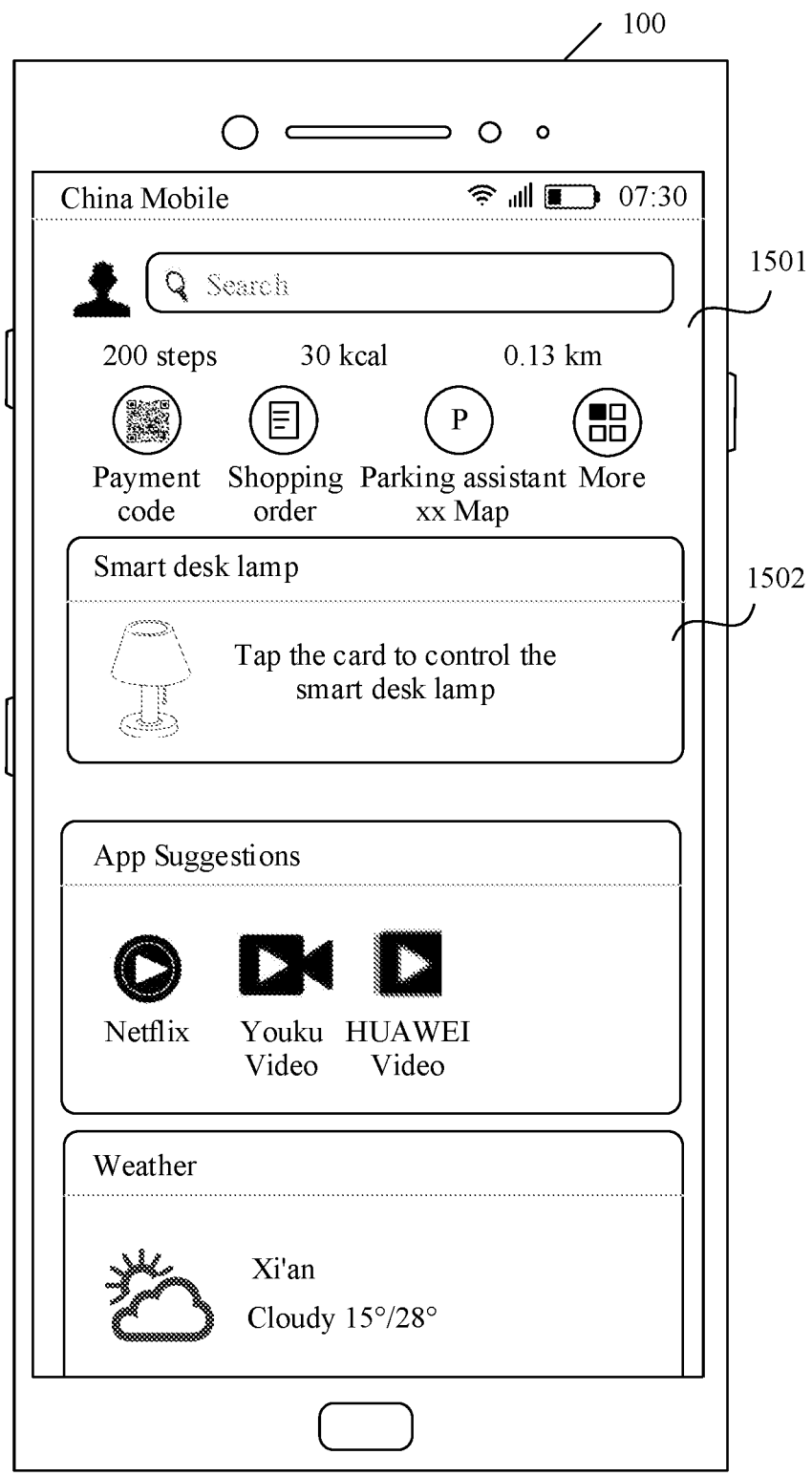
FIG. 15 is a schematic diagram of another display interface of an electronic device according to an embodiment of this application.
Figure 16:
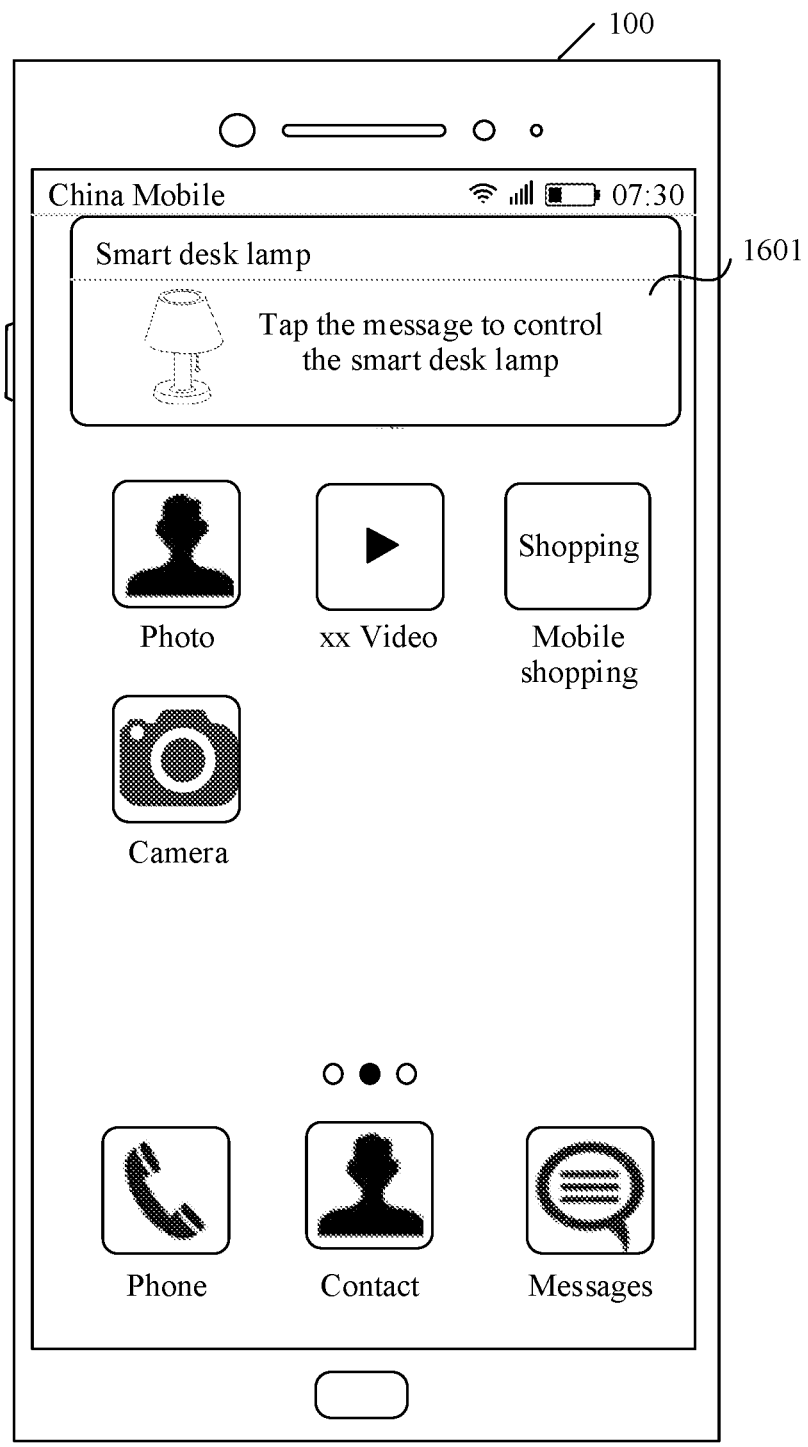
FIG. 16 is a schematic diagram of another display interface of an electronic device according to an embodiment of this application.

In some other embodiments, the electronic device 100 may send third prompt information for the control page of the home device 200 by using the leftmost screen or the notification message. For example, as shown in FIG. 15, the electronic device 100 may send third prompt information 1502 by using the leftmost screen 1501, for example, "Tap the card to control the smart desk lamp". For another example, as shown in FIG. 16, the electronic device 100 may send prompt information 1601 by using the notification message, for example, "Tap the message to control the smart desk lamp". In response to a tap operation performed by the user on the third prompt information, the electronic device 100 may display the control page of the home device 200. For example, in response to a tap operation performed by the user on the prompt information 1502 shown in FIG. 15 or the prompt information 1601 shown in FIG. 16, the electronic device 100 may display the control page 1101 shown in FIG. 11.

In some other embodiments, if the first APP that can provide the preset home service for the user is installed in the electronic device 100, the electronic device 100 may display the control page of the home device 200 in the first APP. A specific manner in which the electronic device 100 displays the control page of the home device 200 is not limited in this embodiment of this application.

S511: In response to an operation performed by the user on the control page of the home device 200, the electronic device 100 sends a control instruction to the home device 200, to control the home device 200.

It should be noted that information such as an interface element on the control page of the home device 200 and the control instruction for controlling the home device 200 is determined based on the configuration information (that is, a Profile) of the home device 200. For a specific method in which the electronic device 100 sends the control instruction to the home device 200 to control the home device 200, refer to related descriptions in a conventional technology. Details are not described herein again.

According to a home device control method provided in this embodiment of this application, the electronic device 100 touches the home device 200 (for example, moves close and away three times within 5 s), so that the home device 200 may be controlled to use the ultra-short-haul antenna, and the electronic device 100 is automatically connected to the home device 200. In this way, the electronic device 100 may obtain the configuration information of the home device 200 from the home device 100, and display the control page of the home device 200, to control the home device 200.

It should be noted that the method in this embodiment of this application is not only applicable to a home device that is configured with a network and registered, but also applicable to a home device that is not configured with a network or registered. That is, regardless of whether the home device is configured with a network and registered, the electronic device can control the home device by using this solution. In this way, a home device control process can be simplified, and use experience of the home device can be improved.

The method provided in this embodiment of this application is particularly applicable to some users who are unfamiliar with a network configuration and registration process of a home device. For such users, the use experience of the home device is improved by using the foregoing solution in which the home device 200 can be controlled only by holding the electronic device 100 to touch the home device 200 (for example, moving close and away three times within 5 s).

Figure 17A:
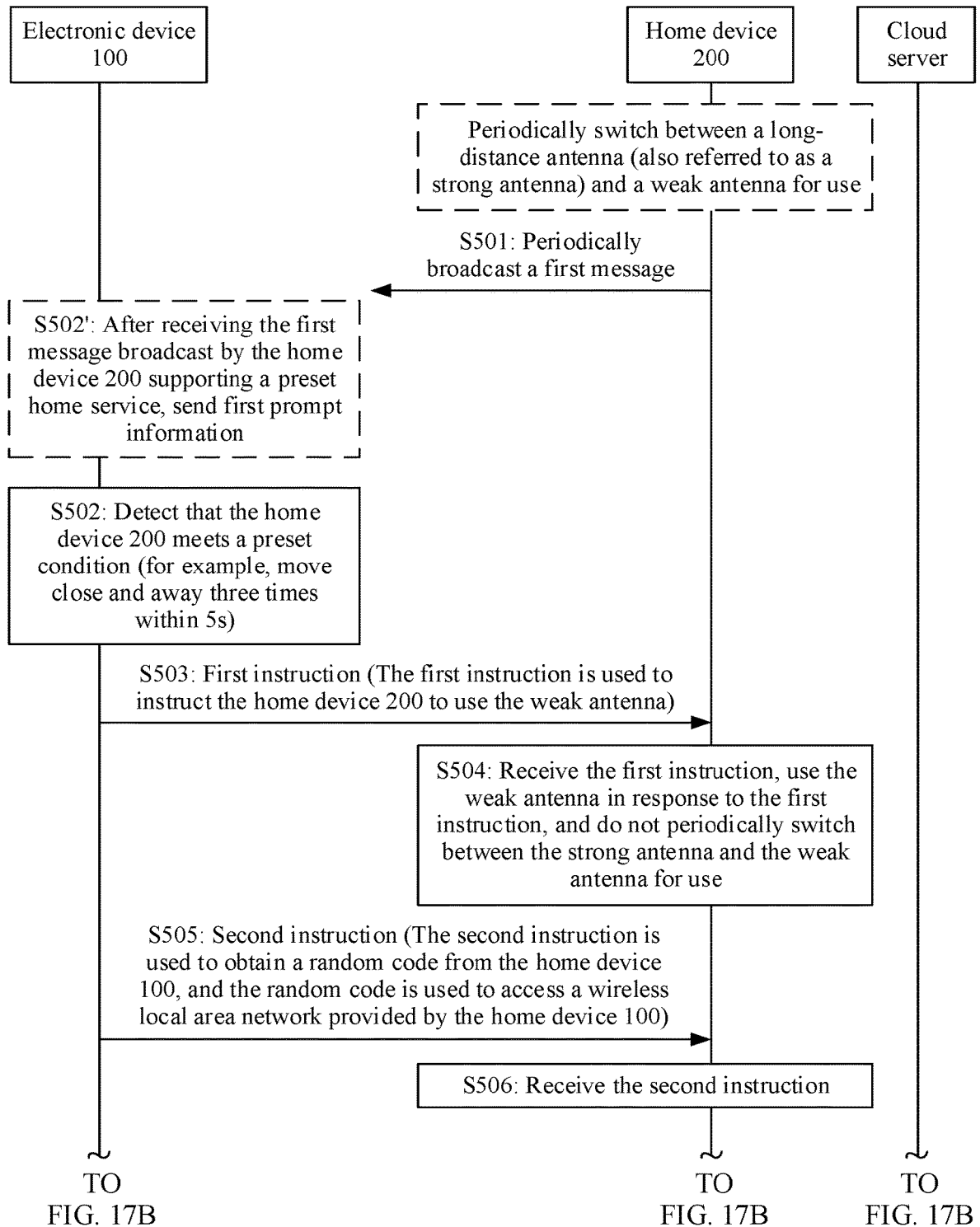
FIG. 17A and FIG. 17B are a flowchart of another home device control method according to an embodiment of this application.
Figure 17B:
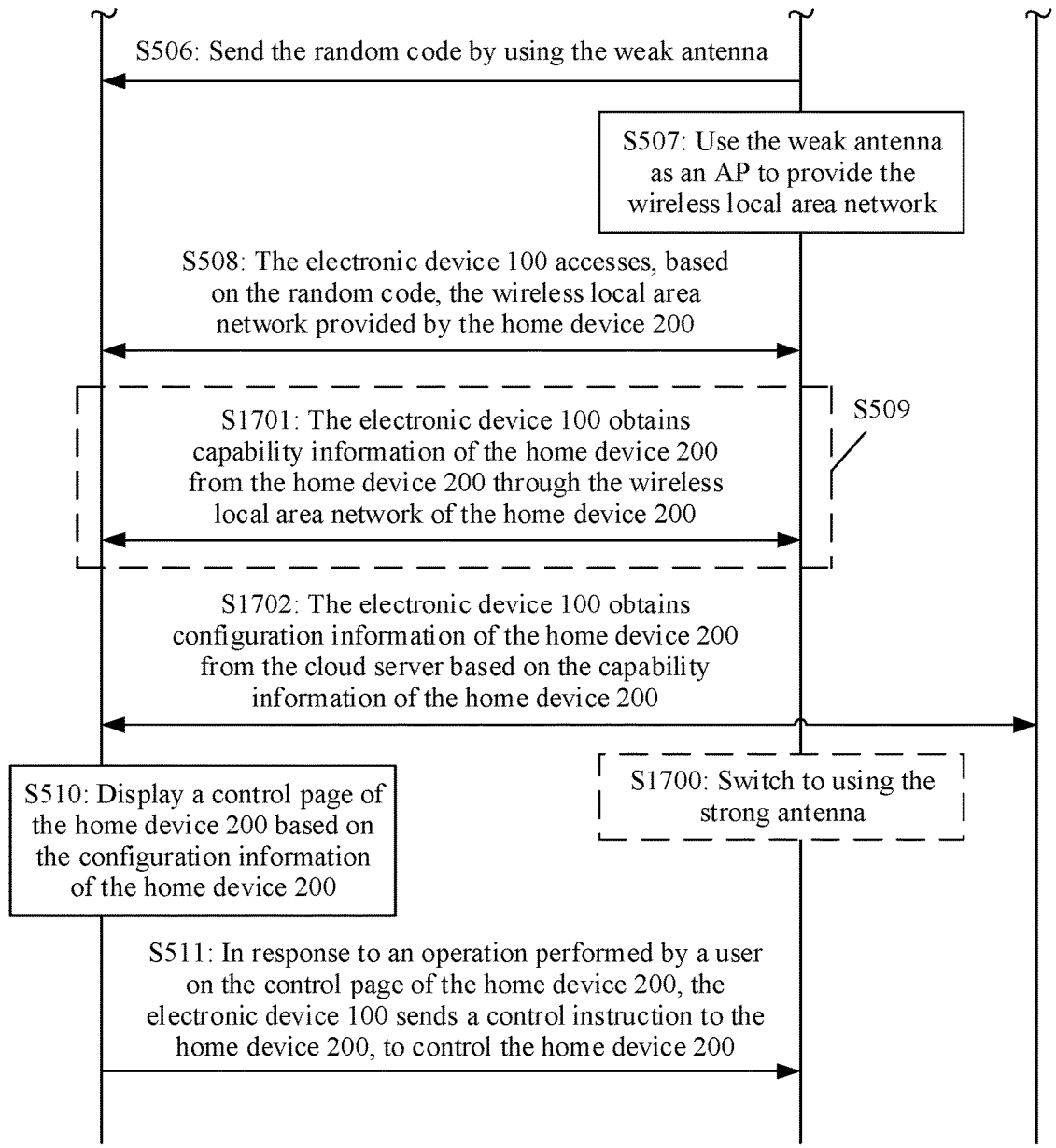

In some other embodiments, an electronic device 100 may obtain configuration information (that is, Profile) of a home device 200 from a cloud server of the home device 200. Specifically, the electronic device 100 may obtain the configuration information of the home device 200 from the cloud server based on capability information of the home device 200. Correspondingly, as shown in FIG. 17B, S509 in the foregoing embodiment may be replaced with S1701. As shown in FIG. 17B, after S1701, the method in this embodiment of this application may further include S1702.

S1701: The electronic device 100 obtains the capability information of the home device 200 from the home device 200 through the wireless local area network of the home device 200.

The capability information of the home device 200 may include indication information of a device type (Device Type) of the home device 200. The device type (Device Type) of the home device 200 may be determined based on a function of the home device 200, that is, determined based on a capability of the home device 200. For example, based on functions of various home devices, the device type of the home device may include an air conditioner, a washing machine, a light, a floor-scanning robot, a smart desk lamp, a smart television, a fan, and the like.

The device type may be referred to as a device type of the home device. Each device type (that is, Device Type) may be further classified into a plurality of product types (Product Type). The product type may be referred to as a device subtype of the home device. For example, home devices of a same device type may be classified into home devices of different product types based on a manufacturer, a product model, and/or the like.

Optionally, capability information of the home device 200 may further include indication information of the product type of the home device 200. Specific functions (that is, capabilities) of home devices of different product types may be different.

In an implementation, the electronic device 100 may send a capability request to the home device 200 through the wireless local area network of the home device 200. After receiving the capability request, the home device 200 may send the capability information of the home device 200 to the electronic device 200.

In another implementation, after S508 (that is, the electronic device 100 accesses the wireless local area network provided by the home device 200), the home device 200 may actively send the capability information of the home device 200 to the electronic device 100.

S1702: The electronic device 100 may obtain the configuration information of the home device 200 from the cloud server based on the capability information of the home device 200.

After obtaining the capability information of the home device 200, the electronic device 100 may send, to the cloud server, a profile request that includes the capability information. The cloud server may include configuration information (that are, profiles) of home devices corresponding to different capability information. After receiving the profile request, the cloud server may query configuration information corresponding to the capability information included in the profile request, and then send the queried configuration information to the electronic device 100.

In the method in this embodiment of this application, the electronic device 100 may obtain the configuration information of the home device 200 from the home device 200, or may obtain the configuration information of the home device 200 from the cloud server.

In some other embodiments, the electronic device 100 may already store the configuration information (that is, a Profile) of the home device 200. For example, the electronic device 100 has performed the method in the embodiments of this application, and obtained and stored the configuration information of the home device 200. For another example, the electronic device 100 has triggered a network configuration and registration process of the home device 200, and obtained and stored the configuration information of the home device 200.

In this embodiment, before performing S509 or S1701 and S1702, the electronic device 100 may determine whether the electronic device 100 stores the configuration information of the home device 200. If the electronic device 100 does not store the configuration information of the home device 200, the electronic device 100 may perform S509 to S511, or S1701 and S1702 and S510 and S511. If the electronic device 100 stores the configuration information of the home device 200, the electronic device 100 may directly perform S510 and S511.

In this embodiment, if the electronic device 100 stores the configuration information of the home device 200, the electronic device 100 does not need to repeatedly obtain the configuration information of the home device 200. In this way, a control process of the home device 200 can be simplified.

It may be understood that, according to the foregoing solution, the electronic device 100 may obtain a control right of the home device 200 once the electronic device 100 touches the home device 200 (for example, moves close and away three times within 5 s). In this solution, although the control process of the home device 200 can be simplified, experience of using the home device 200 by an owner of the home device 200 may be affected because all electronic devices can obtain the control right of the home device 200.

To improve use experience of the owner of the home device 200 in using the home device 200, and ensure security in a use process of the home device 200, in some embodiments, only an electronic device that logs in to an authorized account can obtain the control right of the home device 200. In other words, only the electronic device that logs in to the authorized account can control the home device 200.

In some embodiments, a home device 200 may perform an authorization determination on an electronic device 100 before sending capability information of the home device 200 to the electronic device 100. Specifically, before S1701, the method in this embodiment of this application may further include S1801.

S1801: The home device 200 performs an authorization determination on the electronic device 100.

In an implementation, the home device 200 may store an authorization trustlist of the home device 200. The authorization trustlist includes a plurality of authorized accounts. The authorized account may include at least one of the following types of accounts: an account of a first APP and an account of a manufacturer of an electronic device (for example, a Huawei account). The account of the first APP is an account used to manage the home device 200, or may be considered as an account of a manufacturer of the home device 200.

The authorization trustlist of the home device 200 may be set by a user in the home device 200. Alternatively, the authorization trustlist of the home device 200 may be set by the user by using a primary account bound to the home device 200. For example, the user may operate an electronic device (for example, the electronic device 100) to log in to the primary account (for example, the account of the first APP or the account of the manufacturer of the electronic device), and bind the home device 200 to the primary account. In addition, after logging in to the primary account, any electronic device may receive an update operation (for example, adding an authorized account or deleting an authorized account) performed by the user on the authorization trustlist of the home device 200, and update the authorization trustlist of the home device 200.

For example, the electronic device 100 may send an authorization request to the home device 200. The authorization request includes an account of the electronic device 100. The account of the electronic device 100 may include an account used by the electronic device 100 to log in to the first APP or an account (for example, a Huawei account) of a manufacturer to which the electronic device 100 logs in. After the home device 200 receives the authorization request, whether the account in the authorization request is an authorized account in the authorization trustlist of the home device 200 may be determined. If the account in the authorization request is an authorized account in the authorization trustlist of the home device 200, authorization determining on the electronic device 100 succeeds. If the account in the authorization request is not an authorized account in the authorization trustlist of the home device 200, authorization determining on the electronic device 100 fails.

In another implementation, a cloud server may store an authorization trustlist of each home device. In this implementation, the electronic device 100 may send an authorization request to the home device 200. The authorization request includes an account of the electronic device 100. The account of the electronic device 100 may include an account used by the electronic device 100 to log in to the first APP or an account (for example, a Huawei account) of a manufacturer to which the electronic device 100 logs in. After the home device 200 receives the authorization request, the account of the electronic device 100 may be sent to the cloud server, and the cloud server determines whether the account in the authorization request is an authorized account in the authorization trustlist of the home device 200. If the account in the authorization request is an authorized account in the authorization trustlist of the home device 200, authorization determination on the electronic device 100 succeeds. If the account in the authorization request is not an authorized account in the authorization trustlist of the home device 200, authorization determining on the electronic device 100 fails.

After S1801, if authorization determination of the electronic device succeeds, the electronic device 100 and the home device 200 may perform S1701 and S1702 and S510 and S511. After S1801, if authorization determination of the electronic device fails, a control process of the home device 200 ends.

In some other embodiments, the home device 200 may perform an authorization determination on the electronic device 100 before sending configuration information of the home device 200 to the electronic device 100 (that is, performing S509 or S1702). For a specific method in which the home device 200 performs an authorization determination on the electronic device 100, refer to detailed descriptions in S1801. Details are not described herein again.

In some other embodiments, the home device 200 may further perform authorization determination on the electronic device 100 before the electronic device 100 accesses a wireless local area network provided by the home device 200. The home device 100 allows only an electronic device that passes authorization and authentication to access the wireless local area network provided by the home device 200. For a specific method in which the home device 200 performs authorization determination on the electronic device 100, refer to detailed descriptions in S1801. Details are not described herein again.

In some other embodiments, the home device 100 may perform authorization determination on the electronic device 100 before sending a random code to the electronic device 100. The home device 200 sends the random code only to the electronic device that passes authorization and authentication. For a specific method in which the home device 200 performs authorization determination on the electronic device 100, refer to detailed descriptions in S1801. Details are not described herein again.

It may be understood that if the home device 200 always interacts with the electronic device 100 by using an ultra-short-haul antenna, it is ensured that a distance between the electronic device 100 and the home device 200 is less than or equal to a first distance. If the distance between the electronic device 100 and the home device 200 held by the user is greater than the first distance, the home device 200 cannot receive a control instruction sent by the electronic device 100. In this case, the user cannot control the home device 200 by using the electronic device 100.

In this embodiment of this application, to help the user control the home device 200 by using the electronic device 100, in a phase in which the electronic device 100 controls the home device 200 by using the control instruction, the home device 200 may switch to using a long-distance antenna (that is, a strong antenna), that is, perform S1700.

In some embodiments, the electronic device 100 obtains the configuration information of the home device 200 from the home device 200. After obtaining the configuration information of the home device 200, the electronic device 100 may display a control page of the home device 200, and enter a phase in which the electronic device 100 controls the home device 200 by using the control instruction.

In this embodiment, after sending the configuration information of the home device 200 to the electronic device 100, the home device 100 may switch to using the long-distance antenna (that is, the strong antenna). Alternatively, the home device 200 may switch to using the strong antenna after the electronic device 100 successfully receives the configuration information. For example, the electronic device 100 may send a receiving success indication to the home device 200 after receiving the configuration information from the home device 200. After receiving the receiving success indication, the home device 200 switches to using the strong antenna.

In some other embodiments, the electronic device 100 obtains the configuration information of the home device 200 from the cloud server. In this embodiment, the electronic device 100 may send the receiving success indication to the home device 200 after receiving the configuration information of the home device 200 from the cloud server. After receiving the receiving success indication, the home device 200 switches to using the strong antenna.

It should be noted that, even if the home device 200 switches to using the strong antenna, the wireless local area network provided by the home device 200 used as an AP is unchanged. When the home device 200 uses a wireless local area network provided by a weak antenna used as the AP, a wireless device (for example, the electronic device 100) that accesses the wireless local area network still accesses the wireless local area network after the home device switches to using the strong antenna. A wireless connection between the home device 200 and the electronic device 100 is not disconnected because the home device 200 switches to using the strong antenna.

In this embodiment, in the phase in which the electronic device 100 controls the home device 200 by using the control instruction, the home device 200 may switch to using the long-distance antenna. In this way, the user can remotely control the home device 200 by using the electronic device 100.

Figure 18:
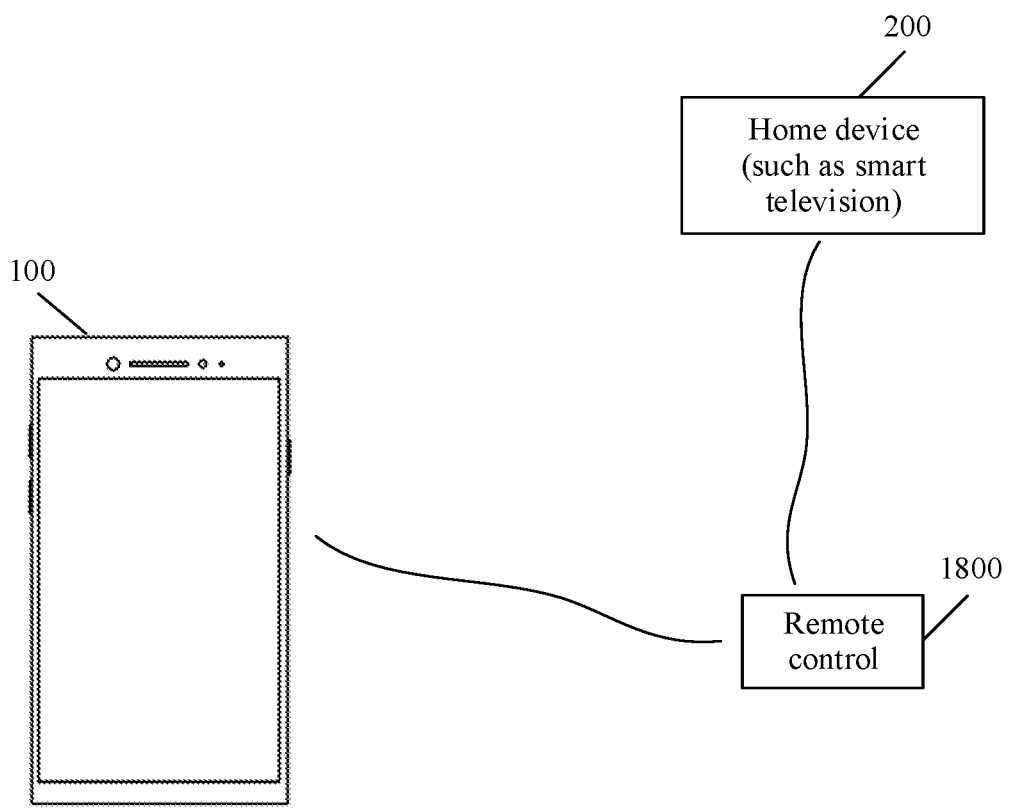
FIG. 18 is a schematic diagram of another communications system applied to a home device control method according to an embodiment of this application.
Figure 19A:
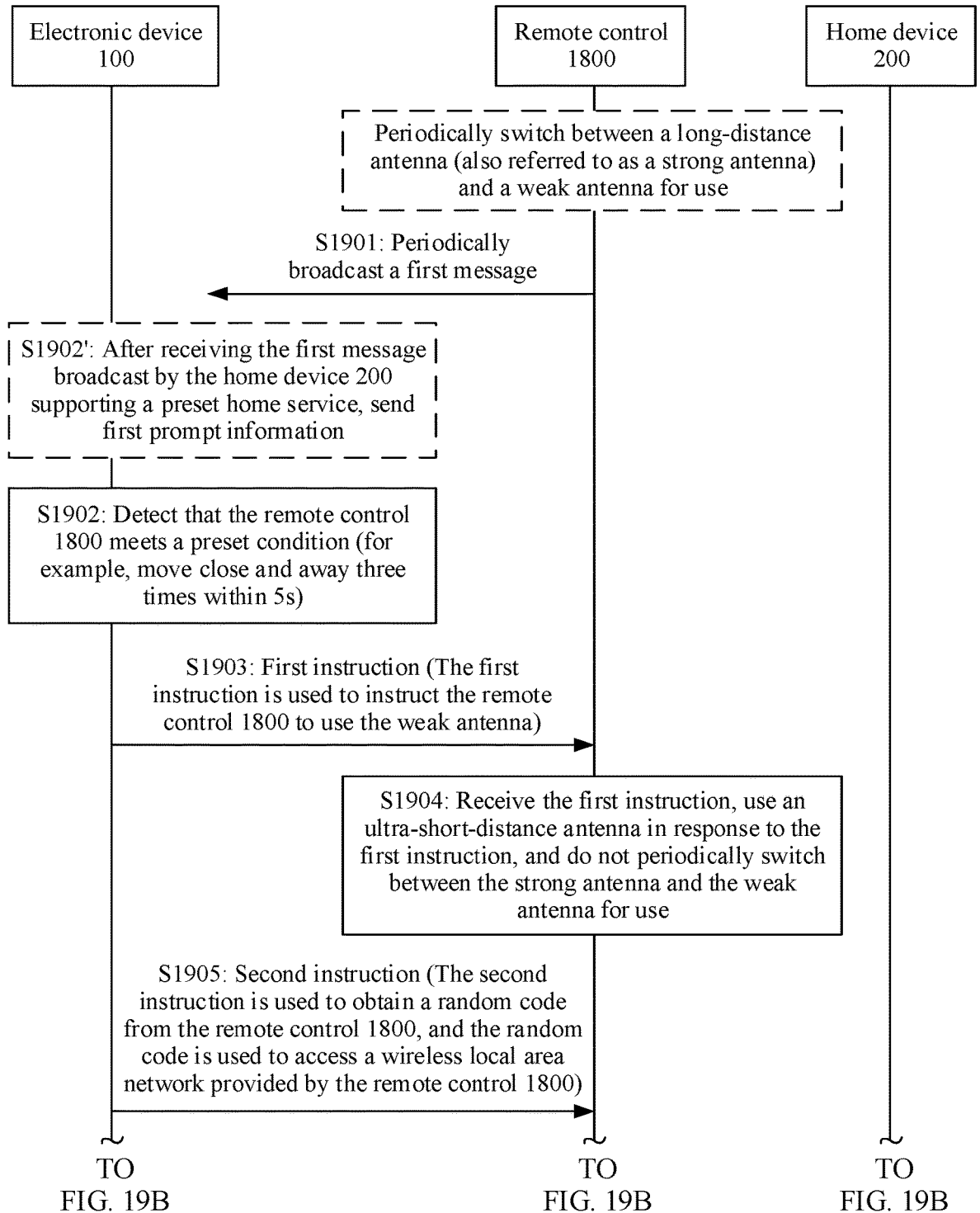
FIG. 19A and FIG. 19B are a flowchart of another home device control method according to an embodiment of this application.
Figure 19B:
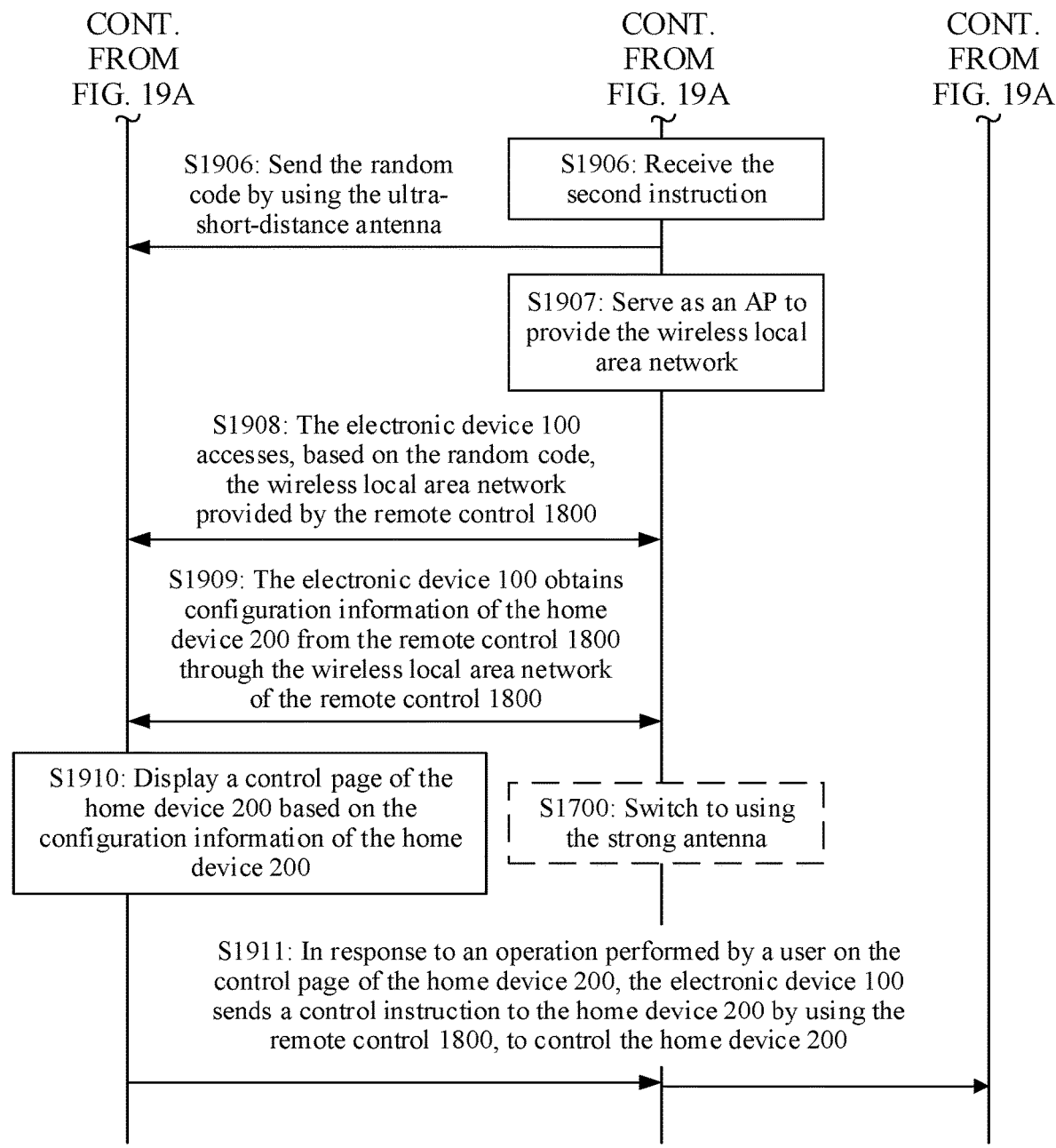

An embodiment of this application provides a home device control method. This may be used for interaction between an electronic device 100, a remote control 1800, and a home device 200 shown in FIG. 18, so that the electronic device 100 controls the home device 200. The remote control 1800 is a remote control of the home device 200. As shown in FIG. 19A and FIG. 19B, the method in this embodiment of this application may include S1901 to S1911.

S1901: The remote control 1800 periodically broadcasts first messages.

For a method in which the remote control 1800 periodically broadcasts the first messages, refer to a method in which the home device 200 periodically broadcasts the first message in S501. Details are not described in this embodiment of this application again.

S1902: The electronic device 100 detects that the remote control 1800 meets a preset condition.

For a method in which the electronic device 100 detects that the remote control 1800 meets the preset condition, refer to the method in which the electronic device 100 detects that the home device 200 meets the preset condition in S502. Details are not described in this embodiment of this application again.

In some other embodiments, as shown in FIG. 19A, before the electronic device 100 detects that the remote control 1800 meets the preset condition, the method in this embodiment of this application may further include S1902'.

S1902': After receiving the first message broadcast by the remote control 1800 of the home device 200 that supports a preset home service, the electronic device 100 sends first prompt information.

For a method in which the electronic device 100 sends the first prompt information, refer to detailed descriptions in S502'. Details are not described in this embodiment of this application again.

If the electronic device 100 detects that the remote control 1800 meets the preset condition, it indicates that the user is willing to control the home device 200 by using the electronic device 100. In this case, the electronic device 100 may interact with the remote control 1800, to control the home device 200. Specifically, if the electronic device 100 detects that the remote control 1800 meets the preset condition, the electronic device 100 may perform S1903.

S1903: The electronic device 100 sends a first instruction to the remote control 1800. The first instruction is used to instruct the remote control 1800 to use a weak antenna.

S1904: The remote control 1800 receives the first instruction, uses an ultra-short-haul antenna in response to the first instruction, and does not periodically switch between a strong antenna and the weak antenna for use.

In S1901, the remote control 1800 may periodically switch between the strong antenna and the weak antenna for use. In this embodiment of this application, after receiving the first instruction, the remote control 1800 may not periodically switch between the strong antenna and the weak antenna for use, but always use the weak antenna until the remote control 1800 receives indication information or an instruction for switching between the strong antenna and the weak antenna for use.

S1905: The electronic device 100 sends a second instruction to the remote control 1800. The second instruction is used to obtain a random code from the remote control 1800. The random code is used to access a wireless local area network provided by the remote control 1800.

S1906: The remote control 1800 receives the second instruction, and sends the random code to the electronic device 100 by using the weak antenna.

S1907: The remote control 1800 is used as an AP to provide the wireless local area network.

S1908: The electronic device 100 accesses, based on the random code, the wireless local area network provided by the remote control 1800.

For specific implementations of S1903 to S1908, refer to detailed descriptions of S503 to S508 in the foregoing embodiment. Details are not described in this embodiment of this application again.

S1909: The electronic device 100 obtains configuration information of the home device 200 from the remote control 1800 through the wireless local area network of the remote control 1800.

For specific content of the configuration information of the home device 200, refer to detailed descriptions in the foregoing embodiment. Details are not described in this embodiment of this application again.

In some embodiments, the electronic device 100 may request the configuration information of the home device 200 from the remote control 1800. Specifically, S1909 may include: The electronic device 100 sends a first request to the remote control 1800 through the wireless local area network of the remote control 1800, and the first request is used to request to obtain the configuration information of the home device 200; the remote control 1800 receives the first request and interacts with the home device 200 to obtain the configuration information of the home device 200; and the remote control 1800 sends a first response to the electronic device 100, and the first response includes the configuration information of the home device 200.

In some other embodiments, the remote control 1800 may actively send the configuration information of the home device 200 to the electronic device 100. Specifically, S1909 may include: After the electronic device 100 accesses the wireless local area network provided by the remote control 1800, the remote control 1800 actively sends the configuration information of the home device 200 to the electronic device 100 through the wireless local area network of the remote control 1800.

S1910: The electronic device 100 displays a control page of the home device 200 based on the configuration information of the home device 200.

For specific implementation of S1910, refer to detailed descriptions of S510 in the foregoing embodiment. Details are not described herein again in this embodiment of this application.

S1911: In response to an operation performed by the user on the control page of the home device 200, the electronic device 100 sends a control instruction to the home device 200 by using the remote control 1800, to control the home device 200.

It should be noted that, in this embodiment, in a phase in which the electronic device 100 controls the home device 200 by using the control instruction, the remote control 1800 may be used as a relay to support interaction between the electronic device 100 and the home device 200. In this embodiment, the remote control 1800 may further replace the home device 200 to interact with the electronic device 100, and perform related steps performed by the home device 200 in any of the foregoing embodiments. For example, the remote control 1800 may further perform steps such as S1700 and S1801.

According to a home device control method provided in this embodiment of this application, the electronic device 100 touches the remote control 1800 of the home device 200 (for example, moves close and away three times within 5 s), so that the remote control 1800 may be controlled to use the ultra-short-haul antenna, and the electronic device 100 is automatically connected to the remote control 1800. In this way, the electronic device 100 may obtain the configuration information of the home device 200 from the remote control

1800, and display the control page of the home device 200, to control the home device 200.

The method in this embodiment of this application is not only applicable to a home device that is configured with a network and registered, but also applicable to a home device that is not configured with a network or registered. That is, regardless of whether the home device is configured with a network and registered, the electronic device can control the home device by using this solution. In this way, a home device control process can be simplified, and use experience of the home device can be improved.

Generally, the remote control 1800 of the home device 200 may be always placed at a position close to the user, that is, at a position close to the electronic device 100. Therefore, in this embodiment, the electronic device 100 can obtain a control right of the home device 200 without a need to ensure that a distance between the electronic device 100 and the home device 200 is less than or equal to a first distance. For example, if the home device 200 is a smart television, the user does not need to operate the electronic device 100 at a location within 30 cm of the smart television, to obtain a control right of the smart television. The user may sit on a sofa, and place a remote control of the smart television around. As long as the electronic device 100 is located within 30 cm of the remote control, the user can obtain a control right of the smart television. According to the method in this embodiment, comfort of controlling a home device by the user by using this solution can be improved, to improve use experience of the user.

In some other embodiments, the first message shown in S501 and S1901 may alternatively be a Bluetooth iBeacon frame. The home device 200 or the remote control 1800 may periodically broadcast the iBeacon frame. For example, the home device 200 or the remote control 1800 may broadcast one or more iBeacon frames every T3. T3 may be any duration such as 2 s, 3 s, or 4 s.

An effective propagation distance of the Bluetooth iBeacon frame (that is, the first message) broadcast by the home device 200 or the remote control 1800 is a third distance. For example, the third distance may be about 1 m or 1 m.

It may be understood that, for example, the home device 200 broadcasts the Bluetooth iBeacon frame. When a distance between an electronic device and the home device 2000 is less than the third distance, the electronic device can receive the iBeacon frame (that is, the first message) broadcast by the home device 200. A shorter distance between the electronic device and the home device 200 indicates a higher signal strength of the first message detected by the home device; and a longer distance between the electronic device and the home device 200 indicates a lower signal strength of the first message detected by the home device.

In the foregoing embodiment, the electronic device 100 may obtain the configuration information of the home device 200 through touching (for example, moving close and away three times within 5 s), and display the control page of the home device 200. In this way, the home device 200 can be controlled by using the electronic device 100.

In some other embodiments, the electronic device 100 may further obtain other information of another electronic device (for example, the home device 200) through touching (for example, moving close and away three times within 5 s).

For example, the foregoing other information may be an address of a uniform resource locator (uniform resource locator, URL) of multimedia data that is being played by the another electronic device. It is assumed that an electronic device (for example, an electronic device 1900) is playing a video 1. For example, the electronic device 1900 may be any device such as a smart television, a mobile phone, a tablet computer, or a notebook computer. The multimedia data may include at least one of audio data and video data.

The electronic device 100 may obtain a URL address of multimedia data played by the electronic device 1900 by touching the electronic device 1900 (for example, moving close and away three times within 5 s). Then, the electronic device 100 may download and play this multimedia file based on the URL address of the multimedia data.

For example, the other information may alternatively be a URL address for selling another electronic device (for example, an electronic device 1910). For example, the electronic device 1910 may be any device such as a smart television, a mobile phone, a tablet computer, a notebook computer, a smart watch, or a smart air conditioner.

The electronic device 100 may obtain a URL address for selling the electronic device 1910 by touching the electronic device 1910 (for example, moving close and away three times within 5 s). Then, the electronic device 100 may log in to the URL address for selling the electronic device 1910 to display a purchase page of the electronic device 1910.

Some other embodiments of this application provide an electronic device. The electronic device may include the display (such as a touchscreen), a memory, and one or more processors. The display and the memory are coupled to the processor. The memory is configured to store computer program code. The computer program code includes computer instructions. When the processor executes the computer instructions, the electronic device may perform the functions or steps performed by the mobile phone in the foregoing method embodiment. For a structure of the electronic device, refer to the structure of the electronic device 200 shown in FIG. 2.

Other embodiments of this application provide a display apparatus. The apparatus may be applied to an electronic device including the touchscreen. The apparatus is configured to perform functions or steps performed by the mobile phone in the foregoing method embodiment.

Figure 20:
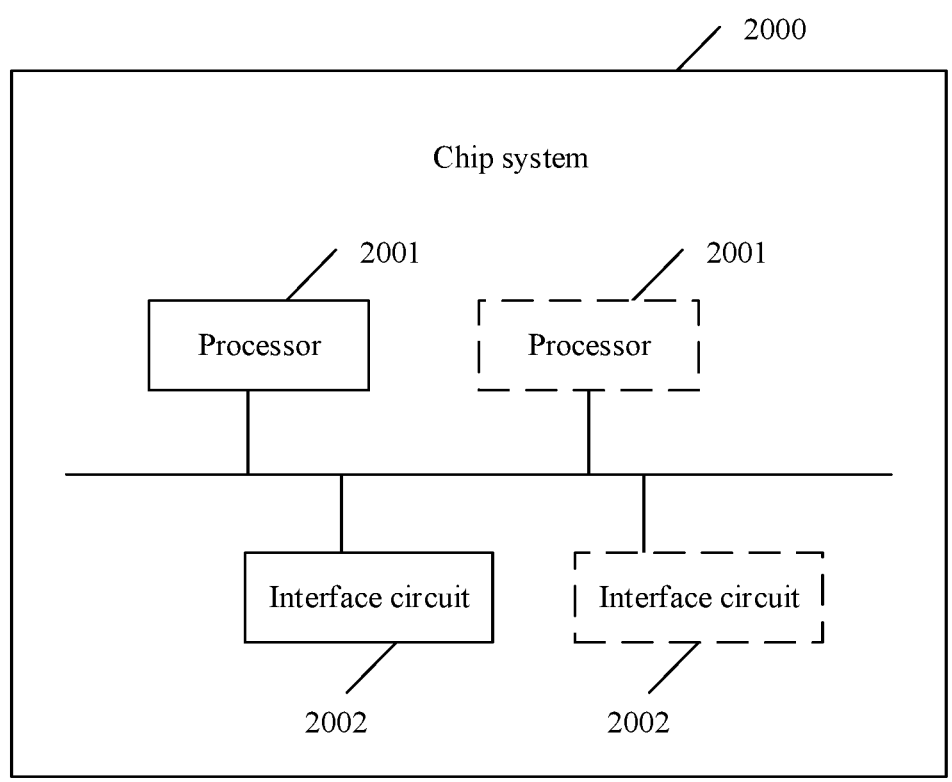
FIG. 20 is a schematic diagram of a structure of a chip system according to an embodiment of this application.

An embodiment of this application further provides a chip system. As shown in FIG. 20, the chip system 2000 includes at least one processor 2001 and at least one interface circuit 2002. The processor 2001 and the interface circuit 2002 may be interconnected through a line. For example, the interface circuit 2002 may be configured to receive a signal from another apparatus (for example, a memory of an electronic device). For another example, the interface circuit 2002 may be configured to send a signal to another apparatus (for example, the processor 2001). For example, the interface circuit 2002 may read instructions stored in a memory, and send the instructions to the processor 2001. When the instructions are executed by the processor 2001, the electronic device is enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiments.

An embodiment of this application further provides a computer program product. When the computer program product is run on a computer, the computer is enabled to perform functions or steps performed by a mobile phone in the foregoing method embodiments.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the current technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A home device control method, comprising:
   detecting, by an electronic device, that a home device meets a present condition when the electronic device receives N first messages broadcast by the home device within a first preset duration, wherein the home device comprises a first antenna having a first transmitting distance and a second antenna having a second transmitting distance, the first transmitting distance is less than the second transmitting distance;
   sending, by the electronic device, a second message to the home device when the electronic device detects that the home device meets the preset condition, wherein the second message is used to indicate the home device to use the first antenna and stop switching from the first antenna to the second antenna;
   receiving, by the electronic device from the home device, a random code for accessing a wireless local area network provided by the home device using the first antenna, wherein the random code is sent by the home device using the first antenna;
   accessing, by the electronic device based on the random code, the wireless local area network to obtain configuration information of the home device, wherein the configuration information comprises an interface element of a control page and a control instruction that are used to control the home device;
   displaying, by the electronic device, the control page of the home device; and
   in response to a user operation performed on the control page, sending, by the electronic device to the home device through the wireless local area network, the control instruction for controlling the home device.

2. The method according to claim 1, wherein that the electronic device detects that the home device meets the preset condition further comprises at least one of:
   a signal strength of the N first messages is greater than a first strength threshold, or the home device that broadcasts the first messages supports a preset home service.

3. The method according to claim 1, wherein before the electronic device detects that the home device meets the preset condition, the method further comprises:
   sending first prompt information after the electronic device receives at least one of the first messages broadcast by the home device that supports a preset home service, wherein the first prompt information is used to indicate a user to move the electronic device close to the home device in a preset manner, wherein
   the preset manner comprises: moving the electronic device close to the home device, to keep a distance between the electronic device and the home device within the first transmitting distance for at least second preset duration, wherein the second preset duration is greater than or equal to the first preset duration.

4. The method according to claim 3, wherein the preset manner comprises: moving the electronic device close to and then away from the home device M times within the second preset duration, wherein a distance between the electronic device and the home device is within the first transmitting distance; and
   that the electronic device detects that the home device meets the preset condition further comprises: a signal strength of the N first messages changes M times under a preset fluctuation condition; and a change under the preset fluctuation condition is that: after a signal strength of one or more first messages received by the electronic device is greater than a second strength threshold, a signal strength of the one or more first messages received by the electronic device is less than a third strength threshold; and
   the second strength threshold is greater than the third strength threshold, the second strength threshold is greater than the first strength threshold, and the first strength threshold is greater than or equal to the third strength threshold.

5. The method according to claim 1, wherein the wireless local area network is an encrypted wireless local area network; the random code is an access password of the wireless local area network, and each of the first messages comprises a service set identifier (SSID) of the wireless local area network; and
  the accessing, by the electronic device, the wireless local area network based on the random code comprises:
  accessing, by the electronic device, the wireless local area network based on the SSID and the access password.

6. The method according to claim 1, wherein the wireless local area network is an encrypted wireless local area network; each of the first messages comprises a service set identifier (SSID) and an access password of the wireless local area network; and the random code is used to perform identity authentication on a device that requests to access the wireless local area network; and
  the accessing, by the electronic device, the wireless local area network based on the random code comprises:
  requesting, by the electronic device, to access the wireless local area network based on the SSID, the access password, and the random code.

7. The method according to claim 1, wherein the wireless local area network is an unencrypted wireless local area network; and each of the first messages comprises a service set identifier (SSID) of the wireless local area network; and
  the accessing, by the electronic device, the wireless local area network based on the random code comprises:
  requesting, by the electronic device, to access the wireless local area network based on the SSID and the random code.

8. The method according to claim 1, wherein the obtaining configuration information of the home device comprises:
  obtaining, by the electronic device, the configuration information of the home device from the home device through the wireless local area network; or
  obtaining, by the electronic device, capability information of the home device from the home device through the wireless local area network, and obtaining, by the electronic device, the configuration information of the home device from a cloud server based on the capability information of the home device, wherein the capability information is used to indicate a device type of the home device.

9. The method according to claim 1, wherein the displaying, by the electronic device, the control page of the home device comprises:
  displaying, by the electronic device, the control page by using a leftmost screen or a notification message; or
  displaying, by the electronic device, prompt information for the control page by using a leftmost screen or a notification message, and displaying, by the electronic device, the control page in response to a tap operation performed by the user on the prompt information.

10. A home device control method,
  periodically switching, by a home device having a first antenna and a second antenna, between the first antenna and the second antenna for use, wherein the first antenna has a first transmitting distance and the second antenna has a second transmitting distance, the first transmitting distance is less than the second transmitting distance;
  broadcasting, by the home device, first messages via the first antenna;
  receiving, by the home device, a second message from an electronic device when at least N first messages are broadcast by the home device within a first preset duration, wherein the second message is used to indicate the home device to use the first antenna and stop switching from the first antenna to the second antenna;
  sending, by the home device to the electronic device via the first antenna, a random code for accessing a wireless local area network provided by the home device using the first antenna;
  providing, by the home device, the wireless local area network using the first antenna;
  receiving, by the home device, an access request from the electronic device, wherein the access request comprises a service set identifier (SSID) of the wireless local area network and the random code;
  allowing, by the home device based on the access request comprising the SSID and the random code, the electronic device to access the wireless local area network using the first antenna;
  receiving, by the home device, a control instruction from the electronic device through the wireless local area network; and
  accepting, by the home device in response to the control instruction, control of the electronic device.

11. The method according to claim 10, wherein before receiving, by the home device, the control instruction from the electronic device through the wireless local area network, and accepting control of the electronic device, the method further comprises:
  sending, by the home device, configuration information of the home device to the electronic device through the wireless local area network by using the first antenna; or
  sending, by the home device, capability information of the home device to the electronic device through the wireless local area network by using the first antenna, wherein the capability information is used to obtain the configuration information of the home device from a cloud server, and the capability information is used to indicate a device type of the home device, wherein
  the configuration information comprises an interface element of a control page and the control instruction that are used to control the home device, and the control page is used to interact with a user to trigger the electronic device to send the control instruction to the home device.

12. The method according to claim 11, wherein before sending, by the home device, the configuration information of the home device to the electronic device through the wireless local area network using the first antenna; or sending, by the home device, capability information of the home device to the electronic device through the wireless local area network by using the first antenna, the method further comprises:
  performing, by the home device, an authorization determination on the electronic device, so as to determine whether the electronic device has permission to obtain the configuration information or the capability information; and
  if the authorization determination succeeds, sending, by the home device, the configuration information or the capability information to the electronic device.

13. The method according to claim 10, wherein the receiving, by the home device, a control instruction from the electronic device through the wireless local area network, and accepting control of the electronic device comprises:

receiving, by the home device, the control instruction through the wireless local area network by using the second antenna, and accepting the control of the electronic device.

14. An electronic device, comprising:
one or more processors; and one or more non-transitory memories storing a computer program code, the computer program code comprising computer instructions that, when executed by the one or more processors, cause the electronic device to perform the following:
detecting that a home device meets a present condition when the electronic device receives N first messages broadcast by the home device within a first preset duration, wherein the home device comprises a first antenna having a first transmitting distance and a second antenna having a second transmitting distance, the first transmitting distance is less than the second transmitting distance;
sending a second message to the home device when the electronic device detects that the home device meets the preset condition, wherein the second message is used to indicate the home device to use the first antenna and stop switching from the first antenna to the second antenna;
receiving from the home device, a random code for accessing a wireless local area network provided by the home device using the first antenna, wherein the random code is sent by the home device using the first antenna;
accessing based on the random code, the wireless local area network to obtain configuration information of the home device, wherein the configuration information comprises an interface element of a control page and a control instruction that are used to control the home device;
displaying the control page of the home device; and
in response to a user operation performed on the control page to the home device through the wireless local area network, the control instruction for controlling the home device.

15. The electronic device according to claim 14, wherein that the electronic device detects that the home device meets the preset condition further comprises at least one of:
a signal strength of the N first messages is greater than a first strength threshold, or the home device that broadcasts the first message supports a preset home service.

16. The electronic device according to claim 14, wherein before the electronic device detects that the home device meets the preset condition, the computer program code further comprises computer instructions that, when executed by the one or more processors, cause the electronic device to perform the following:
sending first prompt information after the electronic device receives at least one of the first messages broadcast by the home device that supports a preset home service, wherein the first prompt information is used to indicate a user to move the electronic device close to the home device in a preset manner, wherein the preset manner comprises: moving the electronic device close to the home device, to keep a distance between the electronic device and the home device within the first transmitting distance for at least second preset duration, wherein the second preset duration is greater than or equal to the first preset duration.

17. The electronic device according to claim 16, wherein the preset manner comprises: moving the electronic device close to and then away from the home device M times within the second preset duration, wherein a distance between the electronic device and the home device is within the first transmitting distance; and
that the electronic device detects that the home device meets the preset condition further comprises: a signal strength of the N first messages changes M times under a preset fluctuation condition; and a change under the preset fluctuation condition is that: after a signal strength of one or more first messages received by the electronic device is greater than a second strength threshold, the signal strength of the one or more first messages received by the electronic device is less than a third strength threshold; and
the second strength threshold is greater than the third strength threshold, the second strength threshold is greater than the first strength threshold, and the first strength threshold is greater than or equal to the third strength threshold.

18. The electronic device according to claim 14, wherein the wireless local area network is an encrypted wireless local area network; the random code is an access password of the wireless local area network, and each of the first messages comprises a service set identifier (SSID) of the wireless local area network; and
the accessing the wireless local area network based on the random code comprises:
accessing the wireless local area network based on the SSID and the access password.

19. The electronic device according to claim 14, wherein the wireless local area network is an encrypted wireless local area network; each of the first message comprise a service set identifier (SSID) and an access password of the wireless local area network; and the random code is used to perform identity authentication on a device that requests to access the wireless local area network; and
the accessing the wireless local area network based on the random code comprises:
requesting to access the wireless local area network based on the SSID, the access password, and the random code.

20. The electronic device according to claim 14, wherein the wireless local area network is an unencrypted wireless local area network; and the first message comprises a service set identifier (SSID) of the wireless local area network; and
the accessing the wireless local area network based on the random code comprises:
requesting to access the wireless local area network based on the SSID and the random code.

* * * * *